(12) United States Patent
Xu et al.

(10) Patent No.: US 12,745,006 B2
(45) Date of Patent: Sep. 22, 2026

(54) BALL BEARING SENSOR SHIFT ARRANGEMENT FOR CAMERA WITH FIXED MAGNETS

(71) Applicant: Apple Inc., Cupertino, CA (US)

(72) Inventors: Bin Xu, Sunnyvale, CA (US); Xu Wang, San Jose, CA (US); Aurelien R. Hubert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 18/991,034

(22) Filed: Dec. 20, 2024

(65) Prior Publication Data

US 2025/0126359 A1 Apr. 17, 2025

Related U.S. Application Data

(63) Continuation of application No. 17/932,254, filed on Sep. 14, 2022, now Pat. No. 12,219,255.

(51) Int. Cl.
*H04N 23/68* (2023.01)
*H02K 41/035* (2006.01)
(Continued)

(52) U.S. Cl.
CPC ....... *H04N 23/687* (2023.01); *H02K 41/0354* (2013.01); *H04N 23/54* (2023.01); *H04N 23/55* (2023.01)

(58) Field of Classification Search
CPC ...... H04N 23/687; H04N 23/54; H04N 23/55; H02K 41/0354
(Continued)

(56) References Cited

U.S. PATENT DOCUMENTS 8,810,714 B2 8/2014 Seol
9,544,482 B2 1/2017 Bang et al.
(Continued)

FOREIGN PATENT DOCUMENTS

CN 201322820 10/2009
CN 108780207 A 11/2018
(Continued)

OTHER PUBLICATIONS

U.S. Appl. No. 17/929,295, filed Sep. 1, 2022, Nicholas D. Smyth, et al.

(Continued)

*Primary Examiner* — Joel W Fosselman
(74) *Attorney, Agent, or Firm* — Robert C. Kowert; Kowert, Hood, Munyon, Rankin & Goetzel, P.C.

(57) ABSTRACT

A ball bearing sensor shift arrangement for a camera may include one or more voice coil motor (VCM) actuators that include the fixed magnets, optical image stabilization (OIS) coils, and/or one or more autofocus (AF) coils. The ball bearing sensor shift arrangement may be coupled with an image sensor of the camera, and may include carrier frames configured to move on ball bearings so as to enable motion of the image sensor in multiple degrees-of-freedom (DOF). An OIS carrier frame(s) may be coupled with the OIS coils, which may be positioned proximate the fixed magnets and used for moving the image sensor in directions orthogonal to an optical axis of the camera. An AF carrier frame may be coupled with the AF coil(s), which may be positioned proximate the fixed magnets and used for moving the image sensor in at least one direction parallel to the optical axis.

20 Claims, 19 Drawing Sheets

(51) Int. Cl.
*H04N 23/54* (2023.01)
*H04N 23/55* (2023.01)

(58) Field of Classification Search
USPC .................................................... 348/208.11
See application file for complete search history.

(56) References Cited

U.S. PATENT DOCUMENTS

| | | | | |
|---|---|---|---|---|
| 10,401,590 | B2 | 9/2019 | Wan et al. | |
| 10,638,031 | B1 | 4/2020 | Brodie et al. | |
| 10,725,313 | B2 | 7/2020 | Sugawara | |
| 10,890,734 | B1 | 1/2021 | Sharma et al. | |
| 10,924,644 | B2 | 2/2021 | Hwang | |
| 10,924,675 | B2 | 2/2021 | Hubert et al. | |
| 11,048,147 | B2 | 6/2021 | Sharma | |
| 11,743,586 | B2 | 8/2023 | Smyth et al. | |
| 2006/0082658 | A1 | 4/2006 | Lee et al. | |
| 2007/0025710 | A1 | 2/2007 | Shin et al. | |
| 2011/0103782 | A1 | 5/2011 | Tsuruta | |
| 2011/0286732 | A1 | 11/2011 | Hosokawa | |
| 2013/0215284 | A1 | 8/2013 | Wade | |
| 2014/0009631 | A1 * | 1/2014 | Topliss | H04N 23/687 348/208.11 |
| 2016/0241787 | A1 | 8/2016 | Sekimoto | |
| 2016/0330375 | A1 | 11/2016 | Sekimoto | |
| 2017/0108705 | A1 | 4/2017 | Yu et al. | |
| 2017/0112369 | A1 | 4/2017 | Czupalla | |
| 2017/0219842 | A1 | 8/2017 | Howarth et al. | |
| 2019/0020822 | A1 | 1/2019 | Sharma | |
| 2019/0049692 | A1 | 2/2019 | Choi et al. | |
| 2019/0137728 | A1 | 5/2019 | Wan et al. | |
| 2019/0141248 | A1 | 5/2019 | Hubert et al. | |
| 2019/0265575 | A1 | 8/2019 | Go et al. | |
| 2019/0377155 | A1 | 12/2019 | Bachar | |
| 2020/0050083 | A1 | 2/2020 | Jeong et al. | |
| 2020/0363626 | A1 | 11/2020 | Seo et al. | |
| 2023/0362490 | A1 | 11/2023 | Smyth et al. | |

FOREIGN PATENT DOCUMENTS

| | | | | |
|---|---|---|---|---|
| JP | 2009141609 | | * | 6/2009 |
| KR | 20100048361 | | | 5/2010 |
| KR | 20180010472 | A | | 1/2018 |
| KR | 20180064738 | | | 6/2018 |
| WO | 2016156996 | | | 10/2016 |

OTHER PUBLICATIONS

U.S. Appl. No. 17/932,254, filed Sep. 14, 2022, Bin Xu, et al.

U.S. Appl. No. 19/183,695, filed Apr. 18, 2025 , Nicholas D. Smyth, et al.

* cited by examiner

BALL BEARING SENSOR SHIFT ARRANGEMENT FOR CAMERA WITH FIXED MAGNETS

PRIORITY CLAIM

This application is a continuation of U.S. patent application Ser. No. 17/932,254, filed Sep. 14, 2022, which is hereby incorporated by reference herein in its entirety.

BACKGROUND

Technical Field

This disclosure relates generally to a ball bearing sensor shift arrangement for a camera with fixed magnets.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1A shows a schematic top view of the camera system. FIG. 1B shows a perspective view of at least a portion of an example ball bearing sensor shift arrangement of the camera system. FIG. 1C shows a schematic top view of a portion of the camera system including a first optical image stabilization (OIS) carrier frame of the ball bearing sensor shift arrangement. FIG. 1D shows a schematic side cross-sectional view of a portion of the camera system including the first OIS carrier frame in FIG. 1C. FIG. 1E shows a schematic top view of a portion of the camera system including a second OIS carrier frame of the ball bearing sensor shift arrangement. FIG. 1F shows a schematic side cross-sectional view of a portion of the camera system including the second OIS carrier frame in FIG. 1E. FIG. 1G shows a schematic top view of a portion of the camera system including an autofocus (AF) coil. FIG. 1H shows a schematic cross-sectional view of a portion of the camera system including the AF coil in FIG. 1G.

FIG. 2A shows a perspective exploded view of the camera system. FIG. 2B shows a perspective collapsed view of the camera system and an example process flow for assembling at least a portion of the camera system. FIG. 2C shows a schematic side cross-sectional view of the camera system, taken at section line A-A indicated in FIG. 2B. FIG. 2D shows a schematic side cross-sectional view of the camera system, taken at section line B-B indicated in FIG. 2B.

FIG. 3A shows a perspective exploded view of the camera system. FIG. 3B shows a perspective collapsed view of the camera system. FIG. 3C shows a schematic side cross-sectional view of the camera system, taken at section line A-A indicated in FIG. 3B.

FIG. 4A shows a schematic top view of the camera system. FIG. 4B shows a perspective view of at least a portion of an example ball bearing sensor shift arrangement of the camera system. FIG. 4C shows a schematic top view of a portion of the camera system including a first optical image stabilization (OIS) carrier frame of the ball bearing sensor shift arrangement. FIG. 4D shows a schematic side cross-sectional view of a portion of the camera system including the first OIS carrier frame in FIG. 4C. FIG. 4E shows a schematic top view of a portion of the camera system including a second OIS carrier frame of the ball bearing sensor shift arrangement. FIG. 4F shows a schematic side cross-sectional view of a portion of the camera system including the second OIS carrier frame in FIG. 4E. FIG. 4G shows a schematic top view of a portion of the camera system including an autofocus (AF) coil. FIG. 4H shows a schematic cross-sectional view of a portion of the camera system including the AF coil in FIG. 4G.

FIG. 5A shows a schematic top view of the camera system. FIG. 5B shows a perspective view of at least a portion of an example ball bearing sensor shift arrangement of the camera system. FIG. 5C shows a schematic top view of a portion of the camera system including a first optical image stabilization (OIS) carrier frame of the ball bearing sensor shift arrangement. FIG. 5D shows a schematic side cross-sectional view of a portion of the camera system including the first OIS carrier frame in FIG. 5C. FIG. 5E shows a schematic top view of a portion of the camera system including a second OIS carrier frame of the ball bearing sensor shift arrangement. FIG. 5F shows a schematic side cross-sectional view of a portion of the camera system including the second OIS carrier frame in FIG. 5E. FIG. 5G shows a schematic top view of a portion of the camera system including an autofocus (AF) coil. FIG. 5H shows a schematic cross-sectional view of a portion of the camera system including the AF coil in FIG. 5G.

Figure 1A:
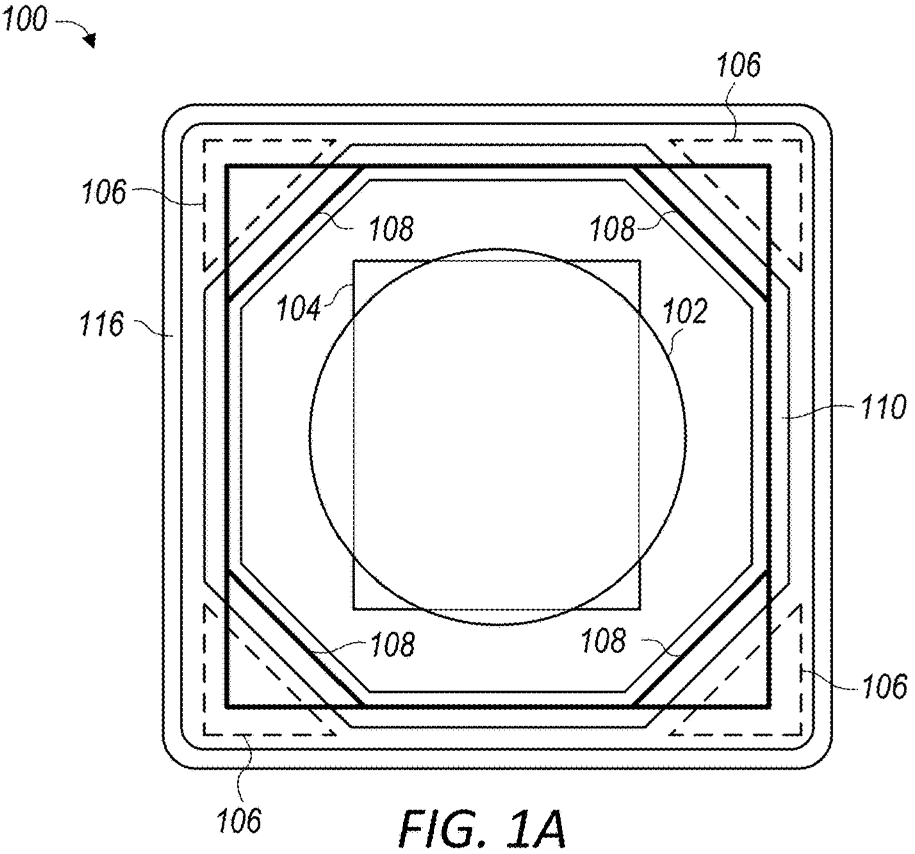
FIGS. 1A-1H illustrate views of an example camera system that includes a ball bearing sensor shift arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]." depending on the context.

DETAILED DESCRIPTION

Various embodiments include a ball bearing sensor shift arrangement for a camera with fixed magnets. In some examples described herein, the terms "camera" and "camera system" may be used interchangeably. The camera may include one or more voice coil motor (VCM) actuators that include the fixed magnets, optical image stabilization (OIS) coils, and/or one or more autofocus (AF) coils. The ball bearing sensor shift arrangement may be coupled with an image sensor of the camera, and may include carrier frames configured to move on ball bearings so as to enable motion of the image sensor in multiple degrees-of-freedom (DOF). In some embodiments, the carrier frames may include one or more OIS carrier frames and/or an AF carrier frame. The OIS carrier frame(s) may be coupled with the OIS coils, which may be positioned proximate the fixed magnets and used for moving the image sensor in directions orthogonal to an optical axis of the camera. The AF carrier frame may be coupled with the AF coil(s), which may be positioned proximate the fixed magnets and used for moving the image sensor in at least one direction parallel to the optical axis.

As the ball bearing sensor shift arrangement enables motion of the image sensor in multiple DOF, the camera may include fixed magnets in various embodiments. Use of fixed magnets, as opposed to movable magnets, may reduce the risk of coexistence with other magnetic field sources (e.g., magnets in a nearby camera). Furthermore, the camera may have a fixed lens group. Use of a fixed lens group, as opposed to a movable lens group, may allow for flexible scaling up of the optic design of the camera.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
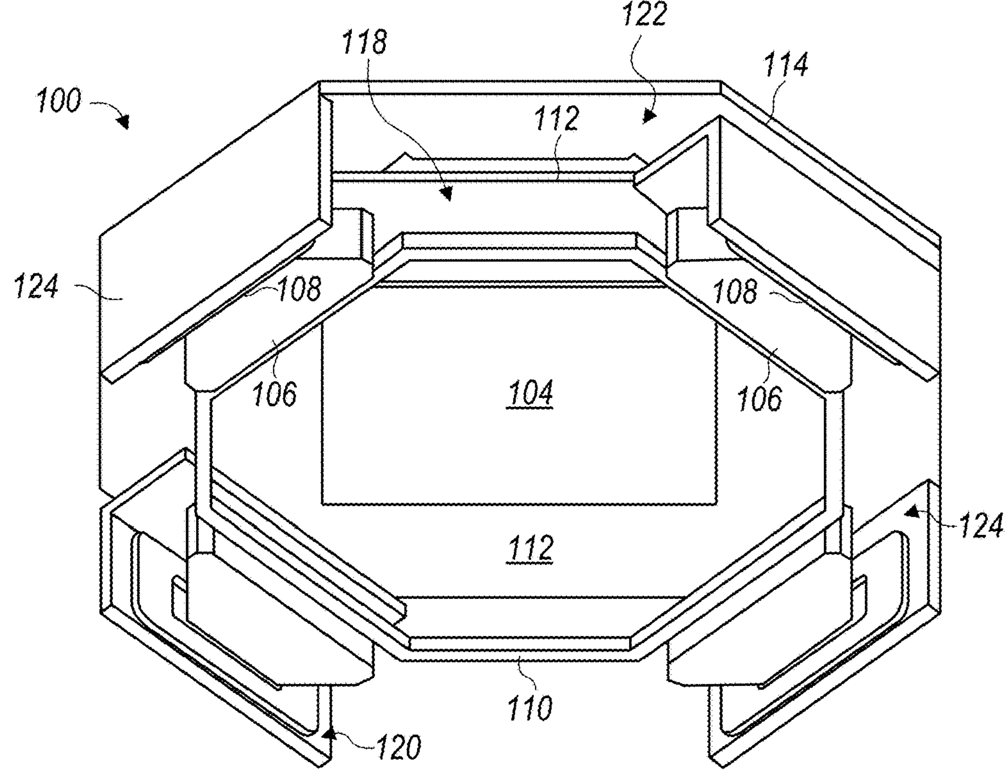
Figure 1C:
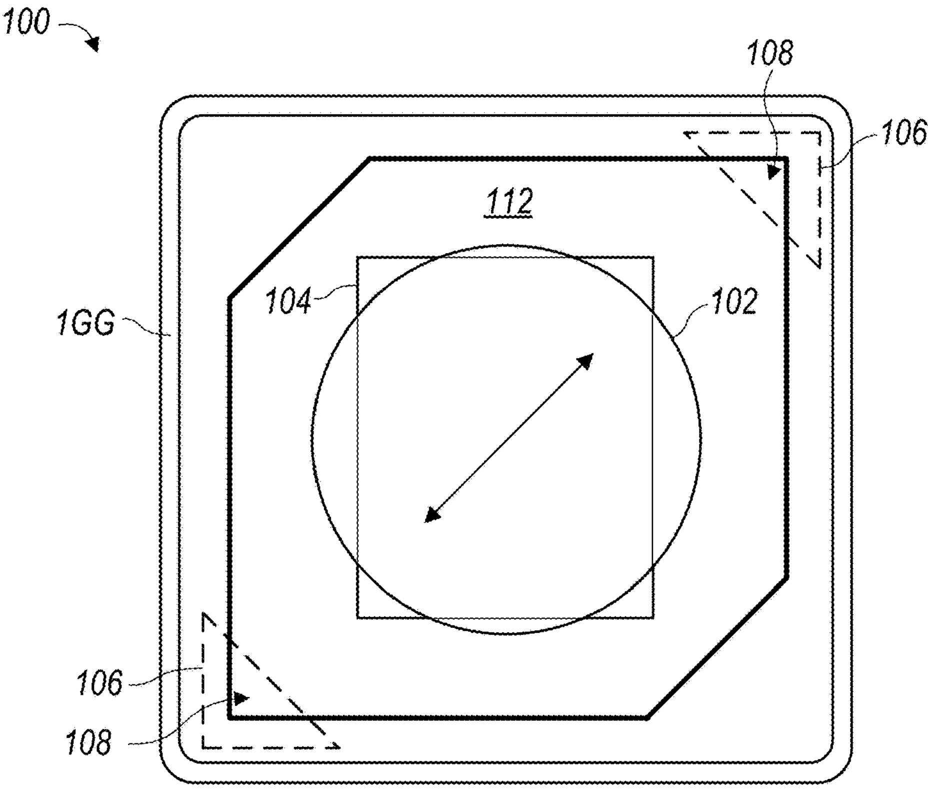
Figure 1D:
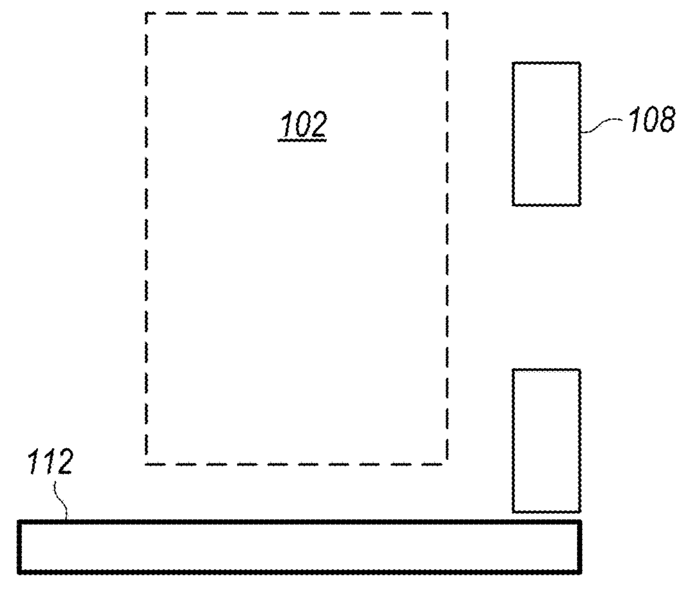
Figure 1E:
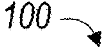
Figure 1E:
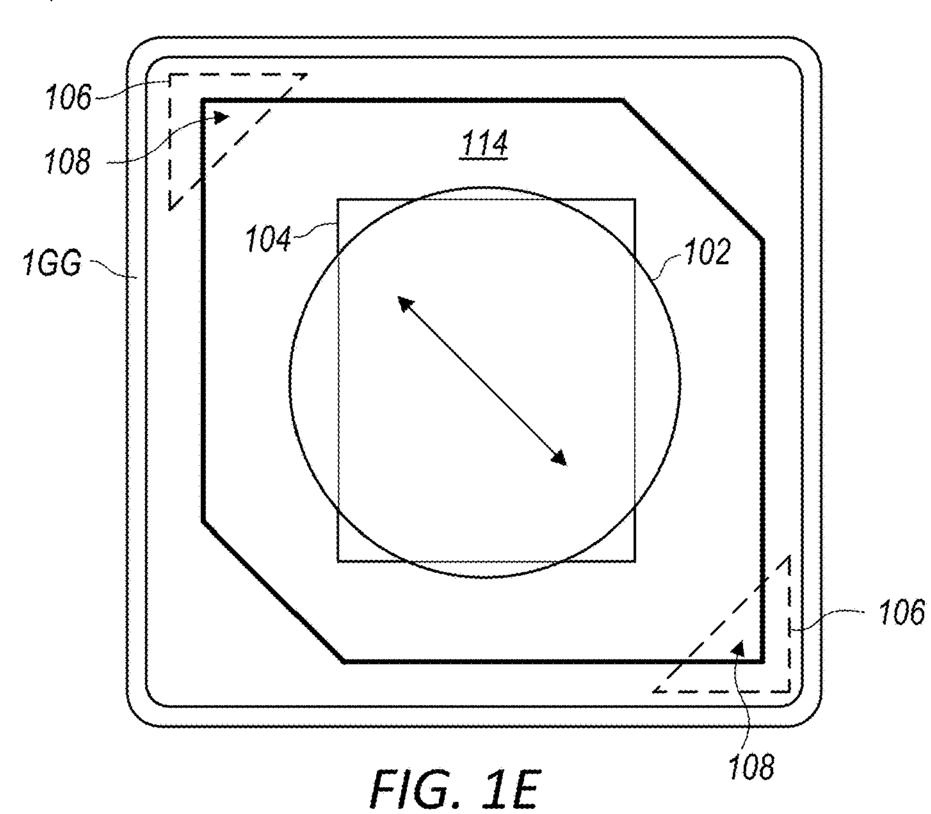
Figure 1F:
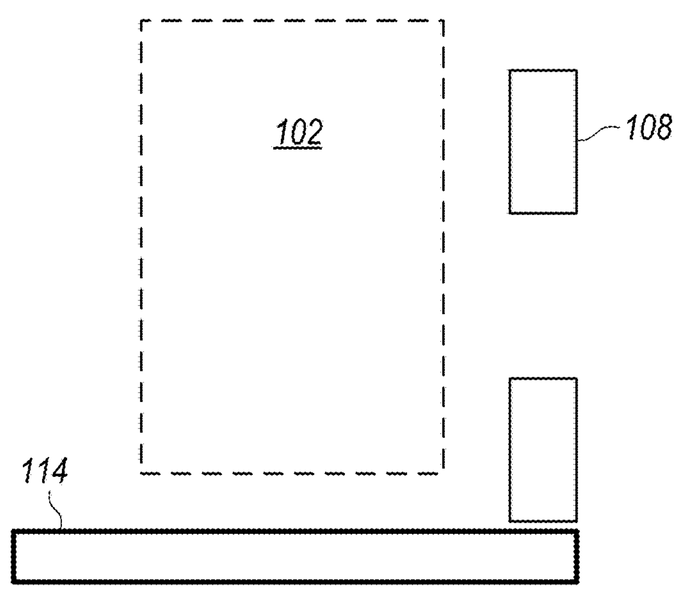
Figure 1G:
Figure 1G:
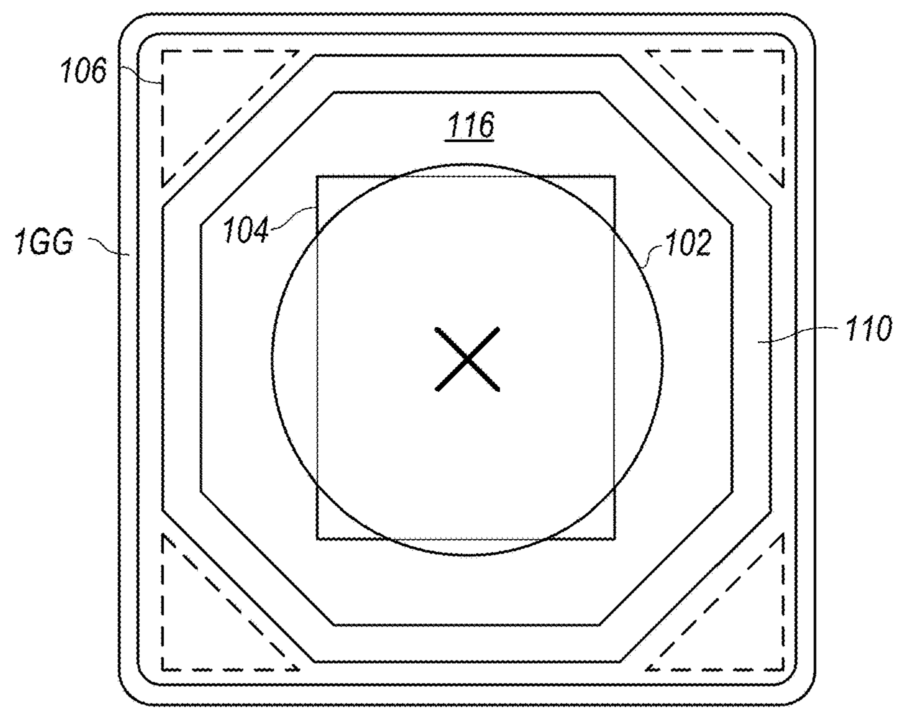
Figure 1H:
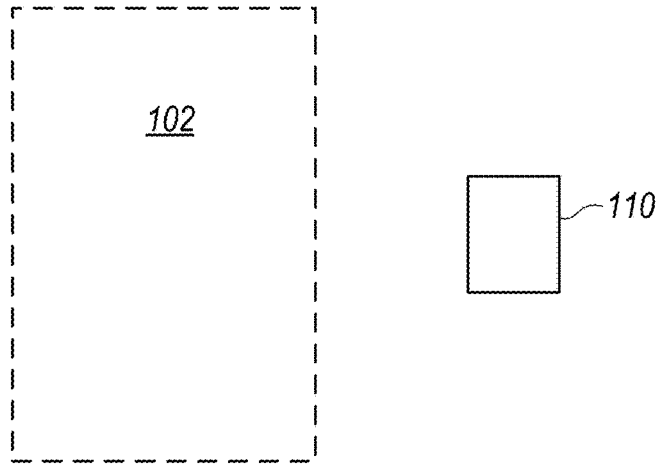

FIGS. 1A-1H illustrate views of an example camera system 100 that includes a ball bearing sensor shift arrangement, in accordance with some embodiments. FIG. 1A shows a schematic top view of the camera system 100. FIG. 1B shows a perspective view of at least a portion of an example ball bearing sensor shift arrangement of the camera system 100. FIG. 1C shows a schematic top view of a portion of the camera system 100 including a first optical image stabilization (OIS) carrier frame of the ball bearing sensor shift arrangement. FIG. 1D shows a schematic side cross-sectional view of a portion of the camera system 100 including the first OIS carrier frame in FIG. 1C. FIG. 1E shows a schematic top view of a portion of the camera system 100 including a second OIS carrier frame of the ball bearing sensor shift arrangement. FIG. 1F shows a schematic side cross-sectional view of a portion of the camera system 100 including the second OIS carrier frame in FIG. 1E. FIG. 1G shows a schematic top view of a portion of the camera system 100 including an autofocus (AF) coil. FIG. 1H shows a schematic cross-sectional view of a portion of the camera system 100 including the AF coil in FIG. 1G.

According to various embodiments, the camera system 100 may include a lens group 102, an image sensor 104, one or more voice coil motor (VCM) actuators (e.g., comprising fixed magnets 106, OIS coils 108, and/or one or more AF coils 110), and/or a ball bearing sensor shift arrangement (e.g., comprising a first OIS carrier frame 112, a second OIS carrier frame 114, and/or an AF carrier frame). The lens group 102 may include one or more lens elements that define an optical axis of the camera system 100. Additionally, or alternatively, the image sensor 104 may define an optical axis of the camera system 100. For example, the optical axis may be an axis that is orthogonal to a light-receiving surface of the image sensor 104.

In some embodiments, the VCM actuator(s) may include one or more OIS actuators and/or one or more AF actuators. According to some embodiments, the OIS actuator(s) may include one or more magnets (e.g., fixed magnets 106) and one or more coils (e.g., OIS coils 108). Furthermore, the AF actuator(s) may include magnet(s) (e.g., fixed magnets 106) and coil(s) (e.g., AF coil 110) in some embodiments. As used herein, a "fixed magnet" refers to a magnet having a position that is fixed relative to component(s) of the camera system 100 that are selectively movable via actuation.

According to some examples, the camera system 100 may include a shield can 116 that at least partially encases internal components of the camera system 100. The fixed magnets 106 may be fixedly coupled with the shield can 116. For example, the camera system 100 may include a spacer (e.g., spacer 220 in FIG. 2A) attached to an underside of the shield can 116, and the fixed magnets 106 may be attached to the spacer, e.g., as further discussed herein with reference to FIG. 2A.

In various embodiments, the OIS coils 108 may be coupled with one or more carrier frames of the ball bearing sensor shift arrangement. As indicated in FIG. 1B, for example, a first subset of the OIS coils 108 may be fixedly attached to the first OIS carrier frame 112, and a second subset of the OIS coils 108 may be fixedly attached to the second OIS carrier frame 114. The OIS coils 108 may be positioned proximate the fixed magnets 106 such that, when driven with an electric current, the OIS coils 108 are capable of electromagnetically interacting with the fixed magnets 106 to move the image sensor 104 in directions orthogonal to the optical axis. In some examples, the OIS coils 108 may be positioned below the fixed magnets 106.

As indicated in FIG. 1B, the first OIS carrier frame 112 may include one or more horizontally-oriented surfaces, such as horizontally-oriented surface 118. Furthermore, the first OIS carrier frame 112 may include one or more vertically-oriented surfaces, such as vertically-oriented surface 120. As used herein, the term "horizontally-oriented" (or similar variations thereof) may refer to an orientation that is orthogonal to the optical axis, and the term "vertically-oriented" (or similar variations thereof) may refer to an orientation that is parallel to the optical axis. In this non-limiting example, the first subset of the OIS coils 108 may include a first OIS coil 108 attached to a first vertically-oriented surface 120, and a second OIS coil 108 attached to a second vertically-oriented surface 120. The first vertically-oriented surface 120 and the second vertically-oriented surface 120 may be opposite one another, e.g., relative to the lens group 102.

Similarly, as indicated in FIG. 1B, the second OIS carrier frame 114 may include one or more horizontally-oriented surfaces, such as horizontally-oriented surface 122. Furthermore, the second OIS carrier frame 114 may include one or more vertically-oriented surfaces, such as vertically-oriented surface 124. In this non-limiting example, the second subset of the OIS coils 108 may include a first OIS coil 108 attached to a first vertically-oriented surface 124, and a second OIS coil 108 attached to a second vertically-oriented surface 124. The first vertically-oriented surface 124 and the second vertically-oriented surface 124 may be opposite one another, e.g., relative to the lens group 102.

According to various embodiments, the first subset of OIS coils 108 attached to the first OIS carrier frame 112 may be arranged to move the image sensor 104 in directions parallel to a first axis. The second subset of OIS coils 108 attached to the second OIS carrier frame 114 may be arranged to move the image sensor 104 in directions parallel to a second axis that is orthogonal to the first axis. As will be discussed in further detail herein with reference to at least FIGS. 2C, 2D, and 3C, the camera system 100 may include ball bearings that allow the frames of the ball bearing sensor shift arrangement to move in accordance with desired OIS and/or AF motion (e.g., using the VCM actuator(s)).

In some embodiments, the OIS coils 108 may be vertically oriented such that, when driven with an electric current, the electric current flows through the OIS coils 108 in directions along a plane that is parallel to the optical axis. In other embodiments, one or more of the OIS coils 108 may be horizontally oriented, e.g., as discussed herein with reference to FIGS. 4A-5H.

In some embodiments, at least a portion of the first OIS carrier frame 112 may be positioned above at least a portion of the second OIS carrier frame 114. For example, the horizontally-oriented surface 118 of the first OIS carrier frame 112 may be positioned above the horizontally-oriented surface 122 of the second OIS carrier frame 114. The horizontally-oriented surface 118 of the first OIS carrier frame 112 may be parallel to the horizontally-oriented surface 122 of the second OIS carrier frame 114. Furthermore, the horizontally-oriented surface 118 of the first OIS carrier frame 112 may be positioned, in a direction parallel to the optical axis, between the second OIS carrier frame 114 and the lens group 102.

As indicated in FIGS. 1A-1B, for example, the fixed magnets 106 and the OIS coils 108 may be considered "corner" magnets and coils in some embodiments, as the fixed magnets 106 and the OIS coils 108 are positioned at corners of the camera system 100 (and/or proximate corners of the image sensor 104). In some other embodiments, the camera system may include fixed magnets and OIS coils that may be considered "side" magnets and coils, e.g., as discussed herein with reference to FIGS. 5A-5H. The side magnets and coils may be positioned at sides of the camera system (and/or proximate sides of the image sensor).

As previously mentioned, the ball bearing sensor shift arrangement may include an AF carrier frame. While not shown in FIGS. 1A-1H, example AF carrier frames are discussed herein with reference to FIGS. 2A-3C.

Figure 2A:
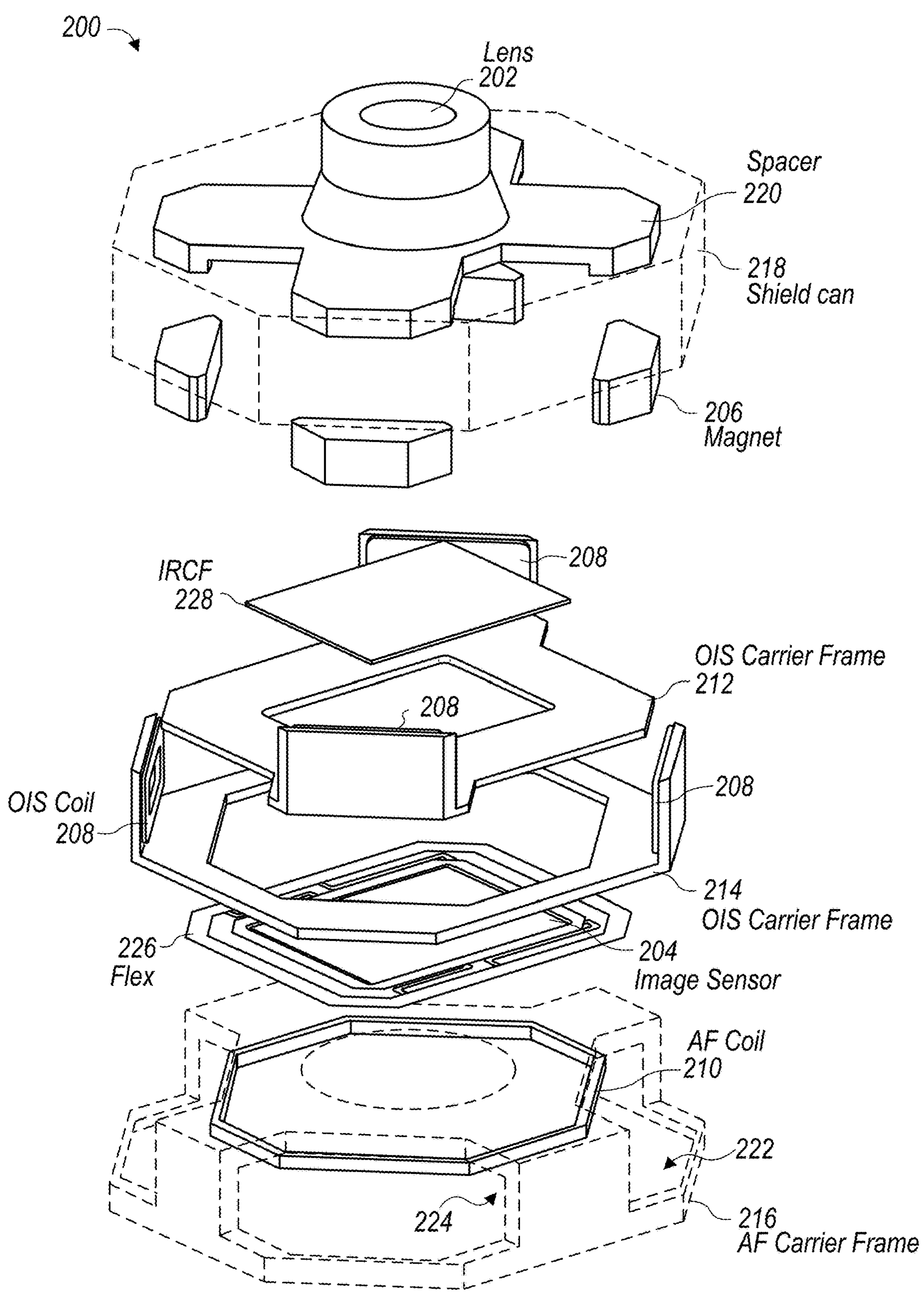
FIGS. 2A-2D illustrate views of an example camera system that includes a ball bearing sensor shift arrangement having multiple optical image stabilization (OIS) carrier frames, in accordance with some embodiments.
Figure 2B:
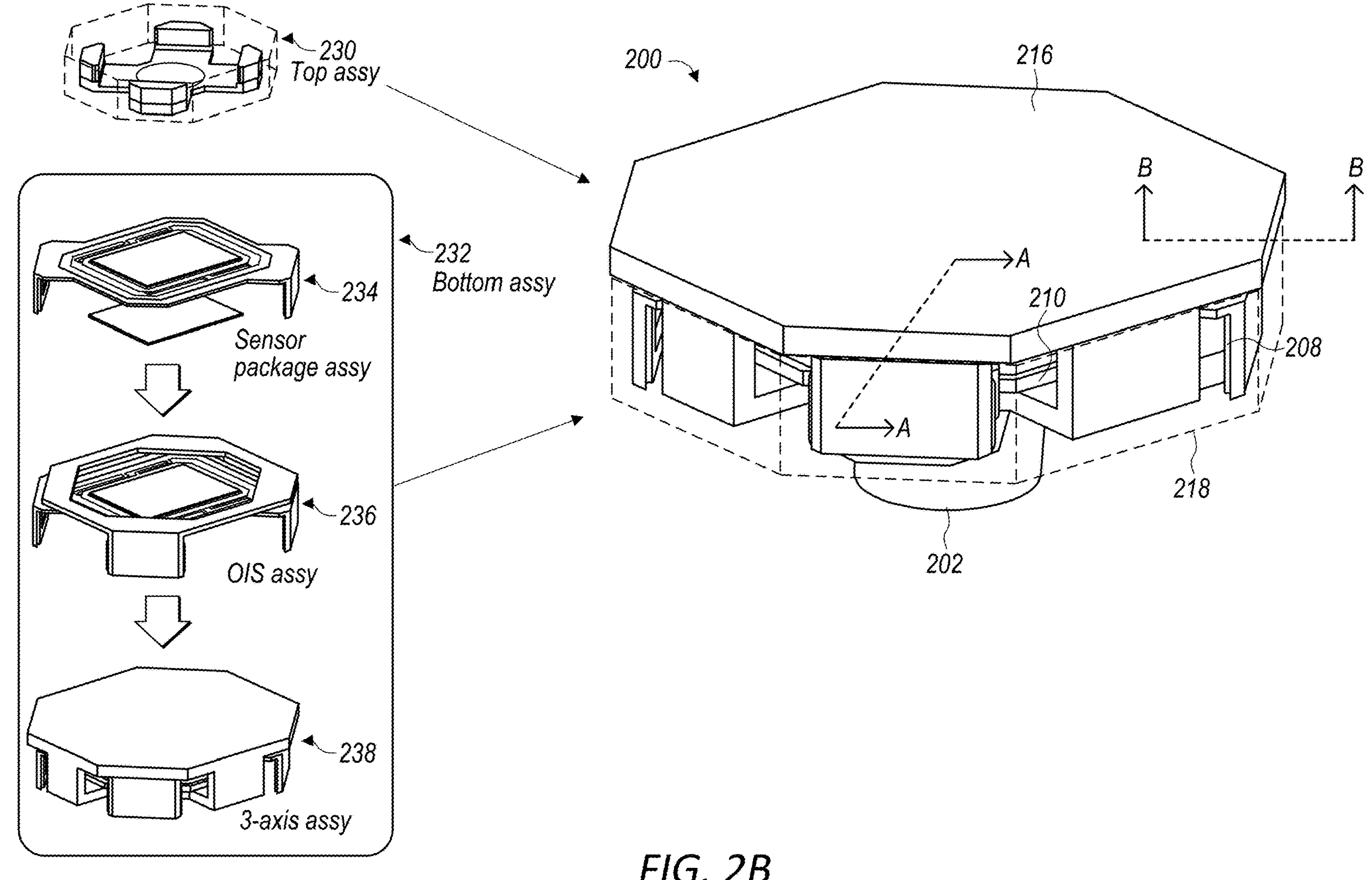
Figure 2C:
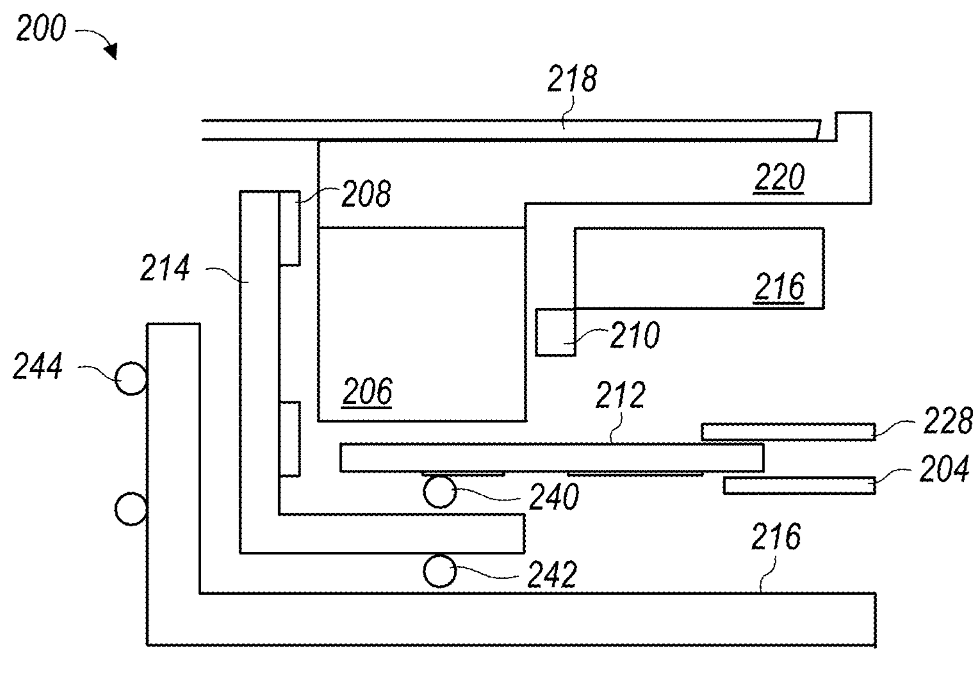
Figure 2D:
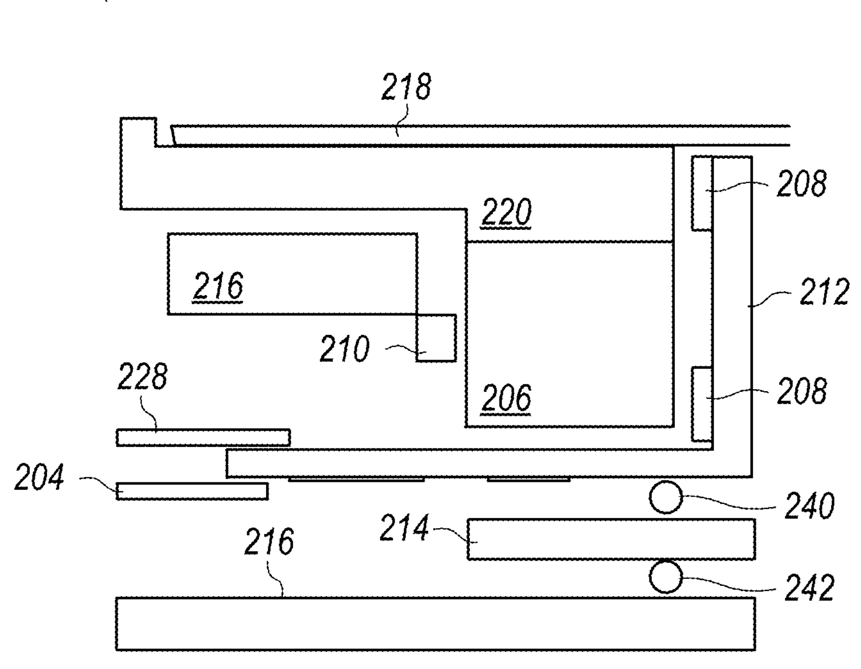

FIGS. 2A-2D illustrate views of an example camera system 200 that includes a ball bearing sensor shift arrangement having multiple optical image stabilization (OIS) carrier frames, in accordance with some embodiments. FIG. 2A shows a perspective exploded view of the camera system 200. FIG. 2B shows a perspective collapsed view of the camera system 200 and an example process flow for assembling at least a portion of the camera system 200. FIG. 2C shows a schematic side cross-sectional view of the camera system 200, taken at section line A-A indicated in FIG. 2B. FIG. 2D shows a schematic side cross-sectional view of the camera system 200, taken at section line B-B indicated in FIG. 2B.

In various embodiments, the camera system 200 may include a lens group 202, an image sensor 204, one or more voice coil motor (VCM) actuators (e.g., comprising fixed magnets 206, OIS coils 208, and/or one or more AF coils 210), and/or a ball bearing sensor shift arrangement (e.g., comprising a first OIS carrier frame 212, a second OIS carrier frame 214, and/or an AF carrier frame 216). The lens group 202 may include one or more lens elements that define an optical axis of the camera system 200. Additionally, or alternatively, the image sensor 204 may define an optical axis of the camera system 200. For example, the optical axis may be an axis that is orthogonal to a light-receiving surface of the image sensor 204.

In some embodiments, the VCM actuator(s) may include one or more OIS actuators and/or one or more AF actuators. According to some embodiments, the OIS actuator(s) may include one or more magnets (e.g., fixed magnets 206) and one or more coils (e.g., OIS coils 208). Furthermore, the AF actuator(s) may include magnet(s) (e.g., fixed magnets 206) and coil(s) (e.g., AF coil 210) in some embodiments. As used herein, a "fixed magnet" refers to a magnet having a position that is fixed relative to component(s) of the camera system 200 that are selectively movable via actuation.

According to some examples, the camera system 200 may include a shield can 218 that at least partially encases internal components of the camera system 200. The fixed magnets 206 may be fixedly coupled with the shield can 218. For example, the camera system 200 may include a spacer 220 attached to an underside of the shield can 218, and the fixed magnets 206 may be attached to the spacer 220.

In various embodiments, the OIS coils 208 may be coupled with one or more carrier frames of the ball bearing sensor shift arrangement. As indicated in FIG. 2A, for example, a first subset of the OIS coils 208 may be fixedly attached to the first OIS carrier frame 212, and a second subset of the OIS coils 208 may be fixedly attached to the second OIS carrier frame 214. The OIS coils 208 may be positioned proximate the fixed magnets 206 such that, when driven with an electric current, the OIS coils 208 are capable of electromagnetically interacting with the fixed magnets 206 to move the image sensor 204 in directions orthogonal to the optical axis.

As indicated in FIG. 2A, each of the first OIS carrier frame 212 and the second OIS carrier frame 214 may include one or more horizontally-oriented surfaces, e.g., similar to, or the same as, horizontally-oriented surfaces 118 and 122 discussed herein with reference to FIG. 1B. Furthermore, each of the first OIS carrier frame 212 and the second OIS carrier frame 214 may include one or more vertically-oriented surfaces, e.g., similar to, or the same as, vertically-oriented surfaces 120 and 124 discussed herein with reference to FIG. 1B. In this non-limiting example, the first subset of the OIS coils 208 may include a first OIS coil 208 attached to a first vertically-oriented surface of the first OIS carrier frame 212, and a second OIS coil 208 attached to a second vertically-oriented surface of the first OIS carrier frame 212. The first vertically-oriented surface and the second vertically-oriented surface may be opposite one another, e.g., relative to the lens group 202.

Similarly, as indicated in FIG. 2A, the second subset of the OIS coils 208 may include a first OIS coil 208 attached to a first vertically-oriented surface of the second OIS carrier frame 214, and a second OIS coil 208 attached to a second vertically-oriented surface of the second OIS carrier frame 214. The first vertically-oriented surface and the second vertically-oriented surface may be opposite one another, e.g., relative to the lens group 202.

According to various embodiments, the first subset of OIS coils 208 attached to the first OIS carrier frame 212 may be arranged to move the image sensor 204 in directions parallel to a first axis. The second subset of OIS coils 208 attached to the second OIS carrier frame 214 may be arranged to move the image sensor 204 in directions parallel to a second axis that is orthogonal to the first axis.

The OIS coils 208 may be vertically oriented such that, when driven with an electric current, the electric current flows through the OIS coils 208 in directions along a plane that is parallel to the optical axis, according to some embodiments. In other embodiments, one or more of the coils 208 may be horizontally oriented, e.g., as discussed herein with reference to FIGS. 4A-5H.

In some embodiments, at least a portion of the first OIS carrier frame 212 may be positioned above at least a portion of the second OIS carrier frame 214. For example, the horizontally-oriented surface of the first OIS carrier frame 212 may be positioned above the horizontally-oriented surface of the second OIS carrier frame 214. The horizontally-oriented surface of the first OIS carrier frame 212 may be parallel to the horizontally-oriented surface of the second OIS carrier frame 214. Furthermore, the horizontally-oriented surface of the first OIS carrier frame 212 may be positioned, in a direction parallel to the optical axis, between the second OIS carrier frame 214 and the lens group 202.

As indicated in FIG. 2A, for example, the fixed magnets 206 and the OIS coils 208 may be considered "corner" magnets and coils in some embodiments, as the fixed magnets 206 and the OIS coils 208 are positioned at corners of the camera system 200 (and/or proximate corners of the image sensor 204). In some other embodiments, the camera system may include fixed magnets and OIS coils that may be considered "side" magnets and coils, e.g., as discussed herein with reference to FIGS. 5A-5H. The side magnets and coils may be positioned at sides of the camera system (and/or proximate sides of the image sensor).

According to various embodiments, the AF coil(s) 210 may be coupled with the AF carrier frame 216. For example, the AF carrier frame 216 may include a base portion 222 and an upward-extending portion 224. The upward-extending portion 224 may be configured to hold the AF coil(s) 210 above the base portion 222, e.g., as indicated in FIG. 2A. In some examples, the AF coil(s) 210 may be fixedly attached to the upward-extending portion 224, and the upward-extending portion 224 may be designed so as to function as a spacer that positions the AF coil(s) at an appropriate location relative to one or more other structural elements/components, e.g., the fixed magnets 206.

In some embodiments, the camera system 200 may include a flex circuit 226 that is coupled with the first OIS carrier frame 212 and/or the AF carrier frame 216. For example, the flex circuit 226 may have a first portion that is attached to the first OIS carrier frame 212, and a second portion that is attached to the AF carrier frame 216. The flex circuit 226 may be configured to convey electrical signals between the first OIS carrier frame 212 and the AF carrier frame 216 in some embodiments. Such electrical signals may include, for example, image signals, power signals, and/or drive signals, etc. Additionally, or alternatively, the flex circuit 226 may be coupled with another flex circuit (not shown) and/or one or more stationary components of the camera system 200. In some embodiments, the stationary component(s) may include a base structure (not shown) of the camera system 200. The flex circuit 226 may be configured to allow one or more components to move relative to one or more other components. As a non-limiting example, the flex circuit 226 may have sufficient service loop to allow the first OIS carrier frame 212 to move relative to the second OIS carrier frame 214 and/or the AF carrier frame 216, during which motion the flex circuit 226 may convey electrical signals from the first OIS carrier frame 212 to the AF carrier frame 216, and/or vice-versa.

In some embodiments, the camera system 200 may include one or more optical filters. For example, the camera system 200 may include an infrared cut-off filter (IRCF) 228 attached to the first OIS carrier frame 212, as indicated in FIG. 2A. The IRCF 228 may be used to block near infrared light from reaching the image sensor 204 in some embodiments.

As indicated in FIG. 2B, a process flow for assembling at least a portion of the camera system 200 may generally include assembling a top assembly 230 and assembling a bottom assembly 232, and coupling the top assembly 230 with the bottom assembly 232. In some non-limiting embodiments, the top assembly 230 may include the lens 202, the fixed magnets 206, the shield can 218, and/or the spacer 220. In some non-limiting embodiments, the bottom assembly 232 may include the image sensor 204, the OIS coils 208, the AF coil(s) 210, the first OIS carrier frame 212, the second OIS carrier frame 214, the AF carrier frame 216, the flex circuit 226, and/or the IRCF 228.

According to some embodiments, assembling the bottom assembly 232 may include assembling a sensor package assembly 234, assembling an OIS assembly 236, and/or assembling a three-axis assembly 238. Assembling the sensor package assembly 234 may include coupling the image sensor 204 with the first OIS carrier frame 212, coupling OIS coils 208 with the first OIS carrier frame 212, coupling the flex circuit 226 with the first OIS carrier frame 212, and/or coupling the IRCF 228 with the first OIS carrier frame 212. Assembling the OIS assembly 236 may include coupling OIS coils 208 with the second OIS carrier frame 214, coupling the flex circuit 226 with the second OIS carrier frame 214, and/or coupling the sensor package assembly 234 with the second OIS carrier frame 214. Assembling the three-axis assembly 238 may include coupling the AF coil(s) 210 with the AF carrier frame 216 and/or coupling the OIS assembly 236 with the AF carrier frame 216. It should be understood that, in various embodiments, certain components of the camera system 200 may be coupled with one another via ball bearings, e.g., as discussed herein with reference to FIGS. 2C-2D.

As indicated in FIGS. 2C-2D, the camera system 200 may include ball bearings that allow the frames of the ball bearing sensor shift arrangement to move in accordance with desired OIS and/or AF motion (e.g., using the VCM actuator (s)). In some embodiments, the ball bearings may include a first set of ball bearings 240, a second set of ball bearings 242, and/or a third set of ball bearings 244.

The first set of ball bearings 240 may be disposed between the first OIS carrier frame 212 and the second OIS carrier frame 214 in some embodiments. The second set of ball bearings 242 may be disposed between the second OIS carrier frame 214 and the AF carrier frame 216 in some embodiments. The third set of ball bearings 244 may be disposed between the AF carrier frame 216 and one or more stationary components of the camera system 200.

According to some embodiments, the first set of ball bearings 240 may be disposed on (and/or at least partially within) one or more tracks not shown) configured to allow motion of the first OIS carrier frame 212, relative to the second OIS carrier frame 214, in at least a first direction orthogonal to the optical axis. In some embodiments, the track(s) for the first set of ball bearings 240 may be defined at least in part by an underside of the first OIS carrier frame 212 and/or a top side of the second OIS carrier frame 214.

The second set of ball bearings 242 may be disposed on (and/or at least partially within) one or more tracks (not shown) configured to allow motion of the second OIS carrier frame 214 (together with the first OIS carrier frame 212), relative to the AF carrier frame 216, in at least a second direction orthogonal to the optical axis and orthogonal to the first direction. In some embodiments, the track(s) for the second set of ball bearings 242 may be defined at least in part by an underside of the second OIS carrier frame 214 and/or a top side of the AF carrier frame 216.

The third set of ball bearings 244 may be disposed on (and/or at least partially within) one or more tracks (not shown) configured to allow motion of the AF carrier frame 216 (together with the image sensor 202, the first OIS carrier frame 212, and the second OIS carrier frame 214), relative to the lens group 202, in at least a third direction parallel to the optical axis and orthogonal to both the first direction and the second direction. In some embodiments, the track(s) for the third set of ball bearings 244 may be defined at least in part by a vertically-oriented side of the AF carrier frame 216 and/or a corresponding vertically-oriented side of a stationary component of the camera system 200, where the corresponding vertically-oriented side of the stationary component is proximate to, and faces, the vertically-oriented side of the AF carrier frame 216.

Figure 3A:
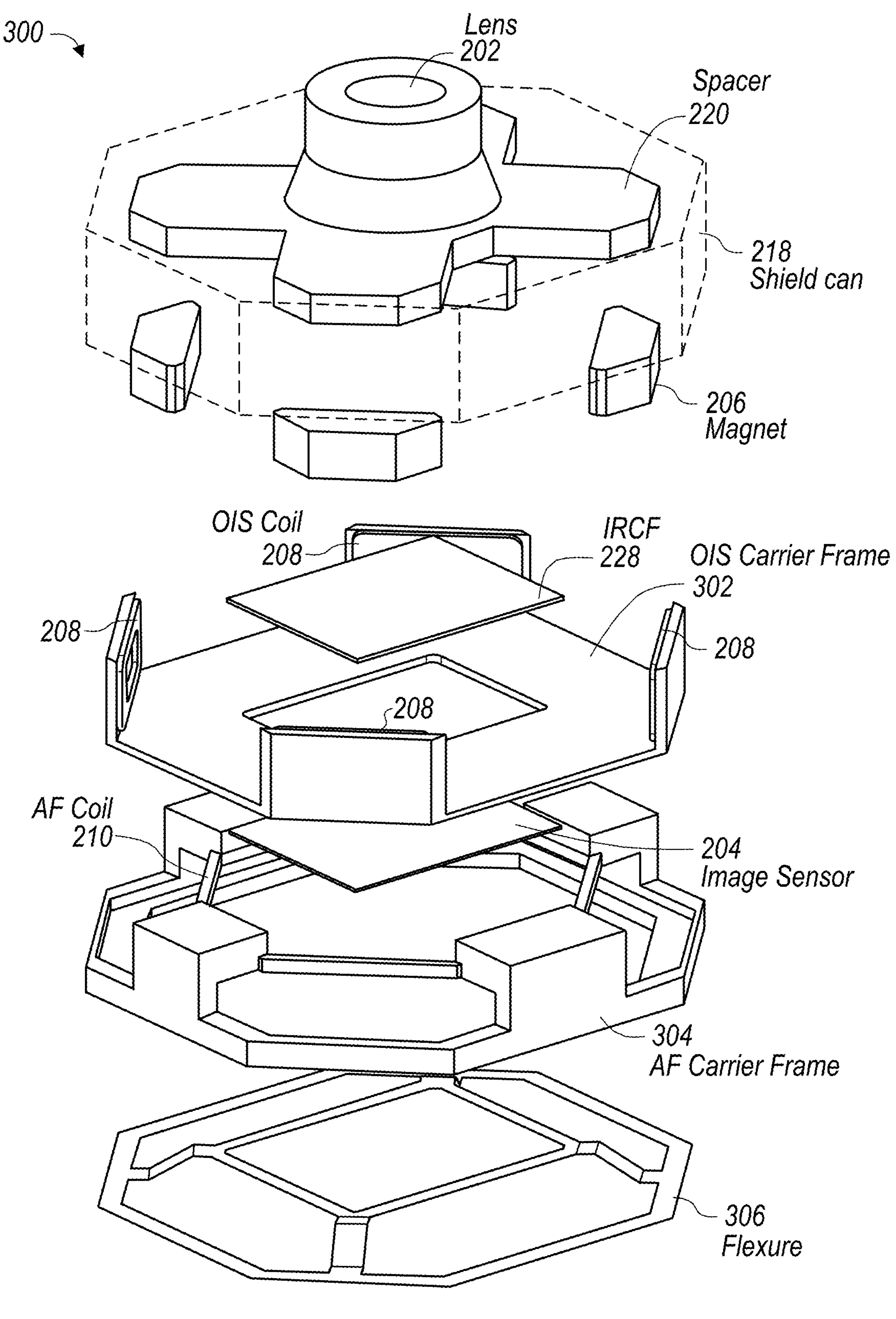
FIGS. 3A-3C illustrate views of an example camera system that includes a ball bearing sensor shift arrangement having a single optical image stabilization (OIS) carrier frame, in accordance with some embodiments.
Figure 3B:
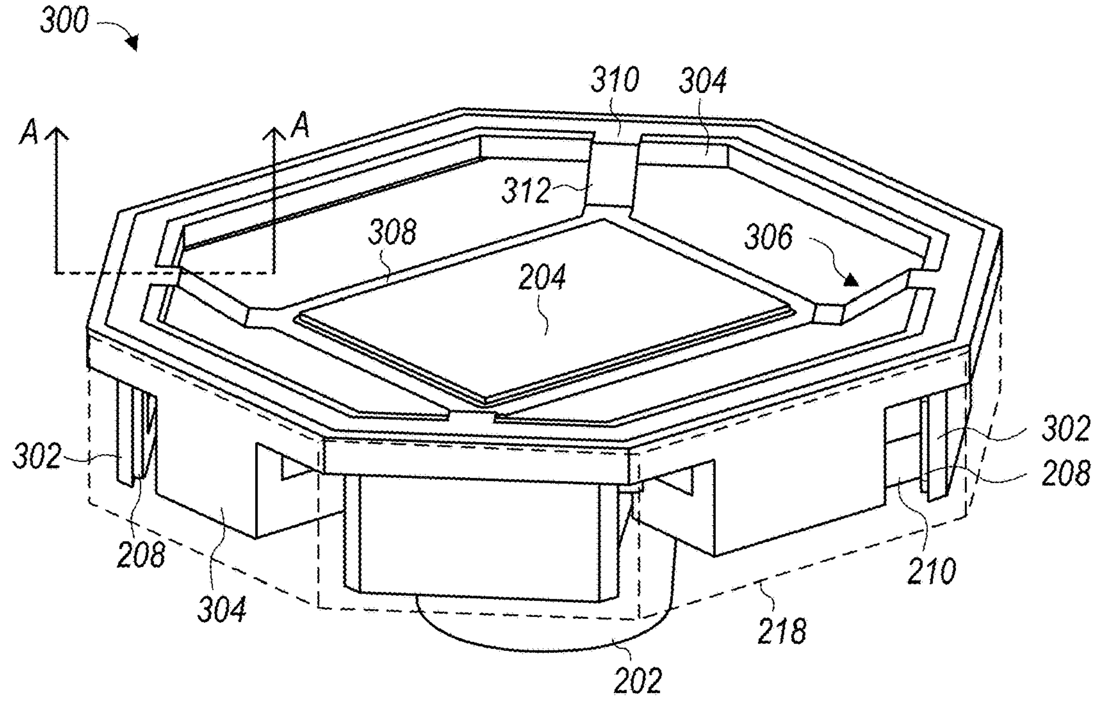
Figure 3C:
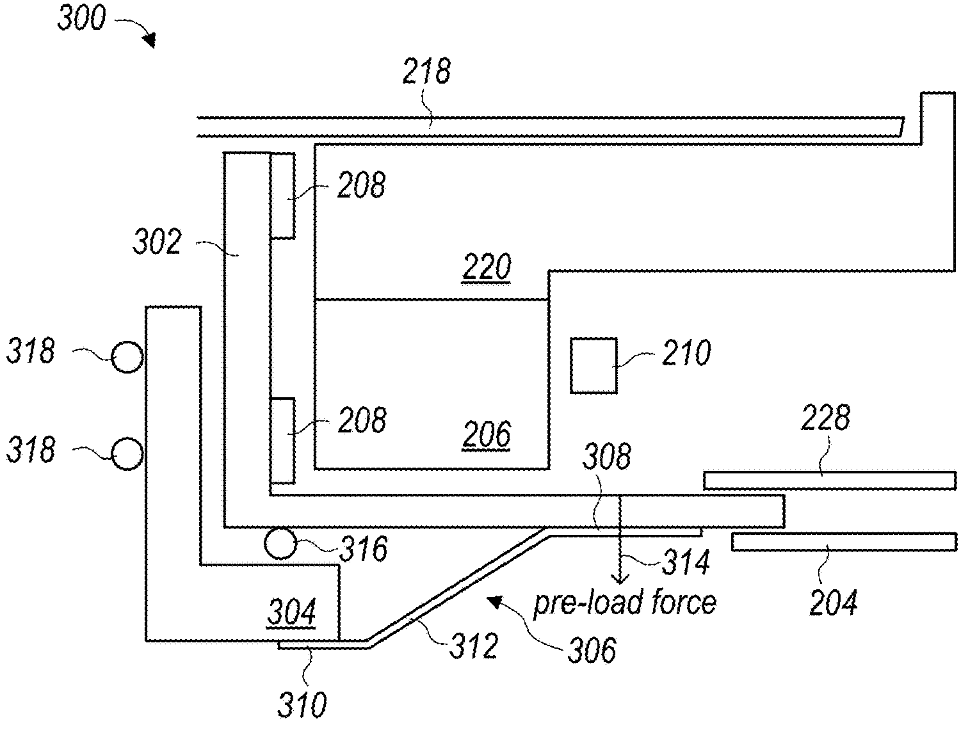

FIGS. 3A-3C illustrate views of an example camera system 300 that includes a ball bearing sensor shift arrangement having a single optical image stabilization (OIS) carrier frame, in accordance with some embodiments. FIG. 3A shows a perspective exploded view of the camera system 300. FIG. 3B shows a perspective collapsed view of the camera system 300. FIG. 3C shows a schematic side cross-sectional view of the camera system 300, taken at section line A-A indicated in FIG. 3B.

In various embodiments, the camera system 300 may include a lens group 202, an image sensor 204, one or more voice coil motor (VCM) actuators (e.g., comprising fixed magnets 206, OIS coils 208, and/or one or more AF coils 210), and/or a ball bearing sensor shift arrangement (e.g., comprising a single OIS carrier frame 302 and/or an AF carrier frame 304). The lens group 202 may include one or more lens elements that define an optical axis of the camera system 300. Additionally, or alternatively, the image sensor 204 may define an optical axis of the camera system 300. For example, the optical axis may be an axis that is orthogonal to a light-receiving surface of the image sensor 204.

In some embodiments, the VCM actuator(s) may include one or more OIS actuators and/or one or more AF actuators.

According to some embodiments, the OIS actuator(s) may include one or more magnets (e.g., fixed magnets 206) and one or more coils (e.g., OIS coils 208). Furthermore, the AF actuator(s) may include magnet(s) (e.g., fixed magnets 206) and coil(s) (e.g., AF coil 210) in some embodiments.

According to some examples, the camera system 300 may include a shield can 218 that at least partially encases internal components of the camera system 300. The fixed magnets 206 may be fixedly coupled with the shield can 218. For example, the camera system 300 may include a spacer 220 attached to an underside of the shield can 218, and the fixed magnets 206 may be attached to the spacer 220.

In various embodiments, the OIS coils 208 may be coupled with a single OIS carrier frame 302. As previously discussed with reference to FIGS. 1A-2D, in some embodiments the ball bearing sensor shift arrangement may include multiple OIS carrier frames; however, as indicated in FIGS. 3A-3C, in some embodiments the ball bearing sensor shift arrangement may instead have a single OIS carrier frame 302 to which all of the OIS coils 208 are attached. The OIS coils 208 may be positioned proximate the fixed magnets 206 such that, when driven with an electric current, the OIS coils 208 are capable of electromagnetically interacting with the fixed magnets 206 to move the image sensor 204 in directions orthogonal to the optical axis.

As indicated in FIG. 3A, the single OIS carrier frame 302 may include one or more horizontally-oriented surfaces, e.g., similar to, or the same as, horizontally-oriented surface 118 discussed herein with reference to FIG. 1B. Furthermore, the single OIS carrier frame 302 may include one or more vertically-oriented surfaces, e.g., similar to, or the same as, vertically-oriented surface 120 discussed herein with reference to FIG. 1B.

In this non-limiting example, a first subset of the OIS coils 208 may include a first OIS coil 208 attached to a first vertically-oriented surface of the single OIS carrier frame 302, and a second OIS coil 208 attached to a second vertically-oriented surface of the single OIS carrier frame 302. The first vertically-oriented surface and the second vertically-oriented surface may be opposite one another, e.g., relative to the lens group 202. The first subset of OIS coils 208 may be configured to move the image sensor 204 in directions parallel to a first axis that is orthogonal to the optical axis.

Furthermore, a second subset of the OIS coils 208 may include a third OIS coil 208 attached to a third vertically-oriented surface of the single OIS carrier frame 302, and a fourth OIS coil 208 attached to a fourth vertically-oriented surface of the single OIS carrier frame 302. The third vertically-oriented surface and the fourth vertically-oriented surface may be opposite one another, e.g., relative to the lens group 202. The second subset of OIS coils 208 may be configured to move the image sensor 204 in directions parallel to a second axis that is orthogonal to the first axis and to the optical axis.

The OIS coils 208 may be vertically oriented such that, when driven with an electric current, the electric current flows through the OIS coils 208 in directions along a plane that is parallel to the optical axis, according to some embodiments. In other embodiments, one or more of the coils 208 may be horizontally oriented, e.g., as discussed herein with reference to FIGS. 4A-5H.

As indicated in FIG. 3A, for example, the fixed magnets 206 and the OIS coils 208 may be considered "corner" magnets and coils in some embodiments, as the fixed magnets 206 and the OIS coils 208 are positioned at corners of the camera system 300 (and/or proximate corners of the image sensor 204). In some other embodiments, the camera system may include fixed magnets and OIS coils that may be considered "side" magnets and coils, e.g., as discussed herein with reference to FIGS. 5A-5H. The side magnets and coils may be positioned at sides of the camera system (and/or proximate sides of the image sensor).

According to various embodiments, the AF coil(s) 210 may be coupled with the AF carrier frame 304. In some embodiments, the AF carrier frame 304 may include a base portion (e.g., base portion 222 in FIG. 2A) and an upward-extending portion (e.g., upward-extending portion 224 in FIG. 2A). The upward-extending portion may be configured to hold the AF coil(s) 210 above the base portion, e.g., as indicated in FIG. 3A. In some examples, the AF coil(s) 210 may be fixedly attached to the upward-extending portion, and the upward-extending portion may be designed so as to function as a spacer that positions the AF coil(s) 210 at an appropriate location relative to one or more other structural elements/components, e.g., the fixed magnets 206.

In some embodiments, the camera system 300 may include a flexure arrangement 306 that is coupled with the single OIS carrier frame 302 and the AF carrier frame 304. As indicated in FIGS. 3B and 3C, the flexure arrangement 306 may include an inner frame 308, an outer frame 310, and one or more flexure arms 312. The inner frame 308 may be attached to the single OIS carrier frame 302. The outer frame 310 may be attached to the AF carrier frame 304. The flexure arm(s) 312 may extend from the inner frame 308 to the outer frame 310. According to some embodiments, the flexure arm(s) 312 may comprise electrical traces configured to convey electrical signals between the inner frame 308 and the outer frame 310. The flexure arrangement 306 may be used to convey electrical signals between the single OIS carrier frame 302 and the AF carrier frame 304. Such electrical signals may include, for example, image signals, power signals, and/or drive signals, etc.

According to some embodiments, the flexure arrangement 306 may have sufficient compliance to allow three-DOF motion of the ball bearing sensor shift arrangement, e.g., so as to allow motion of the image sensor enabled by the VCM actuator(s). Furthermore, the flexure arrangement 306 may have sufficient stiffness to return the single OIS carrier frame 302 to a neutral position (e.g., a position of the single OIS carrier frame 302 at rest when the OIS coils 208 are not being driven to provide OIS functionality). In some embodiments, the flexure arrangement 306 may have sufficient stiffness to provide a pre-load force 314 (e.g., in the direction indicated by arrow 314 in FIG. 3C) for pre-loading the ball bearings against the single OIS carrier frame 302, the AF carrier frame 304, and/or one or more stationary components (e.g., a base structure) of the camera system 300.

As indicated in FIG. 3C, the camera system 300 may include ball bearings that allow the frames of the ball bearing sensor shift arrangement to move in accordance with desired OIS and/or AF motion (e.g., using the VCM actuator (s)). In some embodiments, the ball bearings may include a first set of ball bearings 316, and a second set of ball bearings 318. The first set of ball bearings 316 may be disposed between the single OIS carrier frame 302 and the AF carrier frame 304 in some embodiments. According to some embodiments, the first set of ball bearings 316 may be used to enable OIS motion in at least two directions that are orthogonal to each other and that are orthogonal to the optical axis. The second set of ball bearings 318 may be disposed between the AF carrier frame 304 and one or more stationary components (e.g., a base structure) of the camera system 300. The second set of ball bearings 318 may be used to enable AF motion in a direction that is parallel to the optical axis and orthogonal to the directions of OIS motion enabled by the first set of ball bearings 316.

According to some embodiments, the first set of ball bearings 316 may be disposed on (and/or at least partially within) one or more tracks not shown) configured to allow motion of the single OIS carrier frame 304, relative to the AF carrier frame 304 and/or the lens group 202. In some embodiments, the track(s) for the first set of ball bearings 316 may be defined at least in part by an underside of the single OIS carrier frame 302 and/or a top side of the AF carrier frame 304.

The second set of ball bearings 318 may be disposed on (and/or at least partially within) one or more tracks (not shown) configured to allow motion of the AF carrier frame 304 (together with the single OIS carrier frame 302), relative to the lens group 202. In some embodiments, the track(s) for the second set of ball bearings 318 may be defined at least in part by a vertically-oriented side of the AF carrier frame 304 and/or a corresponding vertically-oriented side of a stationary component (e.g., a base structure) of the camera system 300, where the corresponding vertically-oriented side of the stationary component is proximate to, and faces, the vertically-oriented side of the AF carrier frame 304.

Figures 4A, 4B:
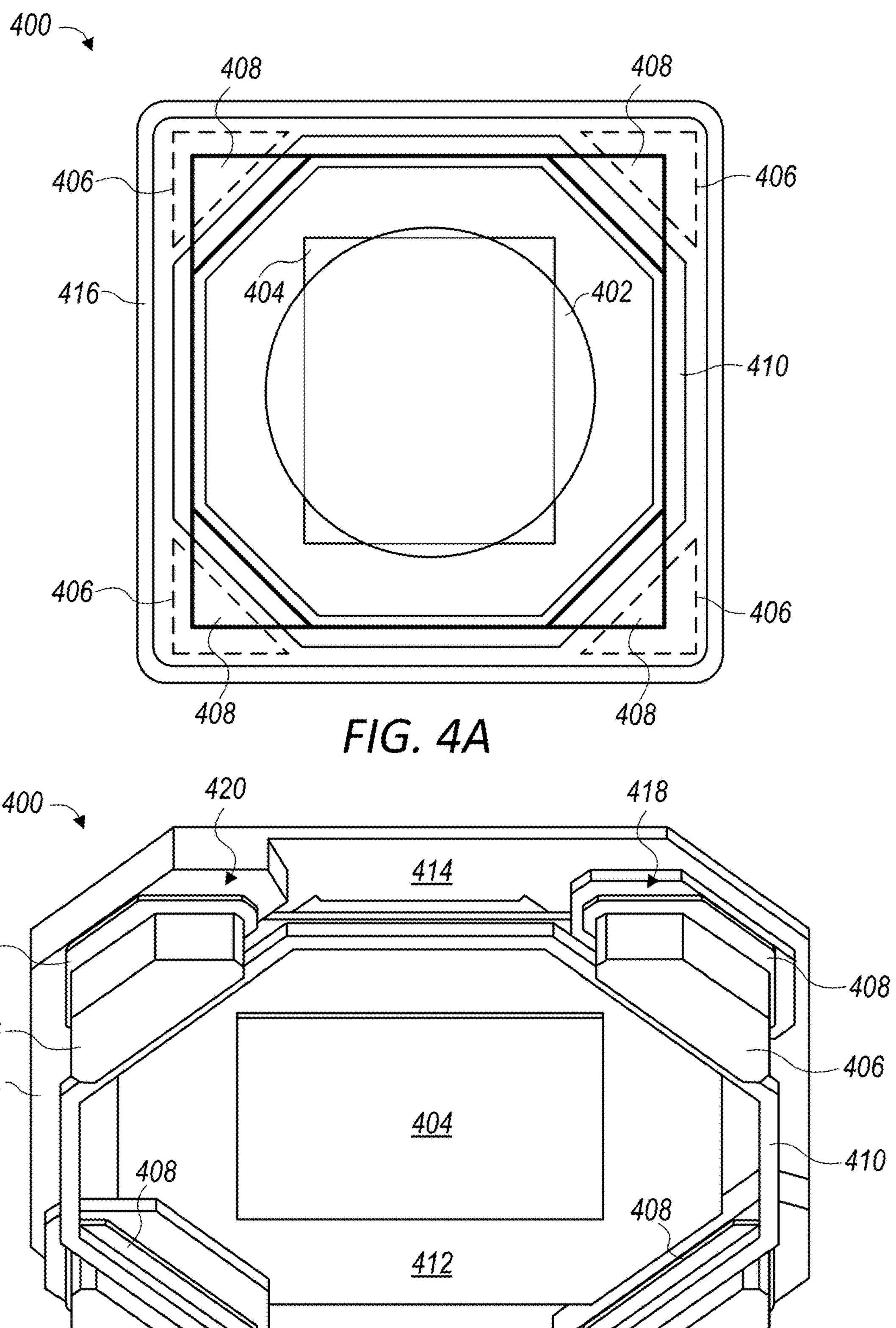
FIGS. 4A-4H illustrate views of another example camera system that includes a ball bearing sensor shift arrangement (e.g., a ball bearing sensor shift arrangement for coupling with horizontally-oriented coils), in accordance with some embodiments.
Figure 4C:
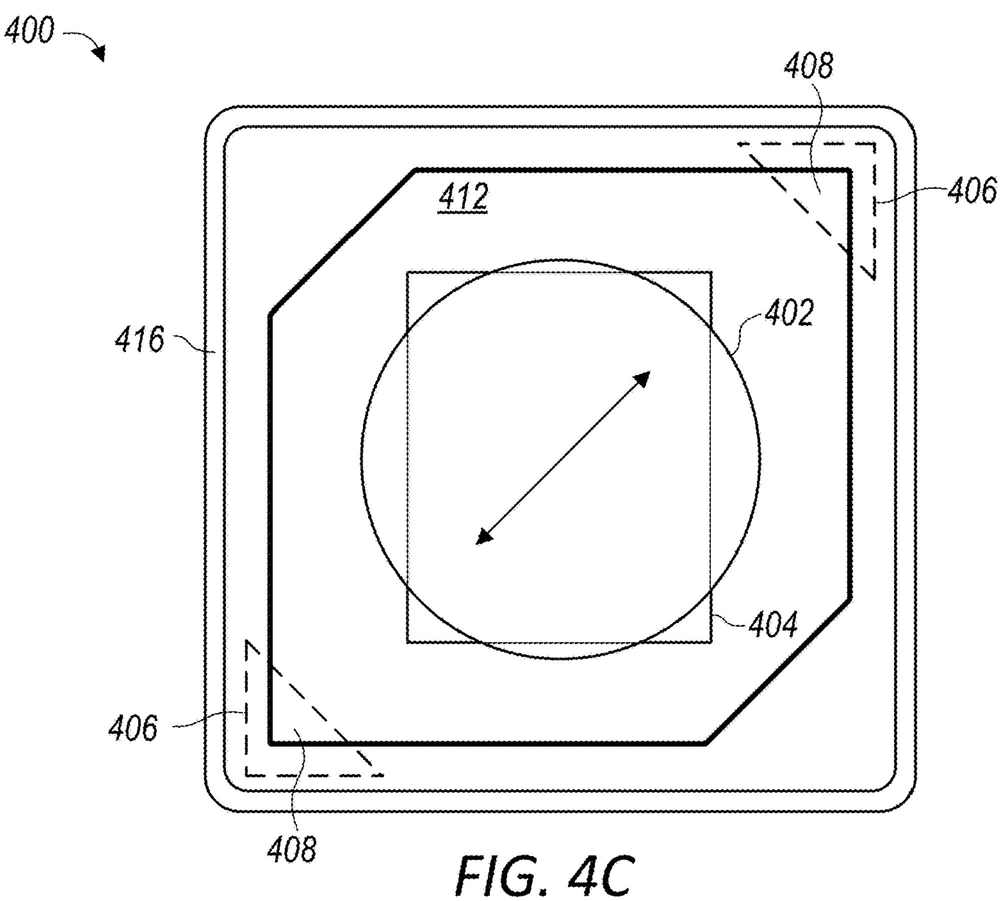
Figure 4D:
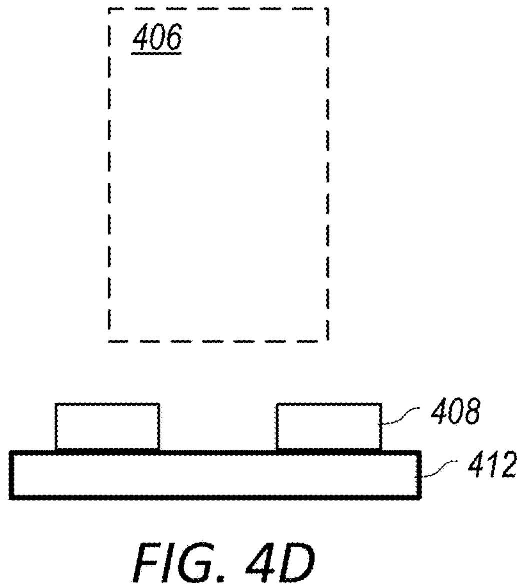
Figure 4E:
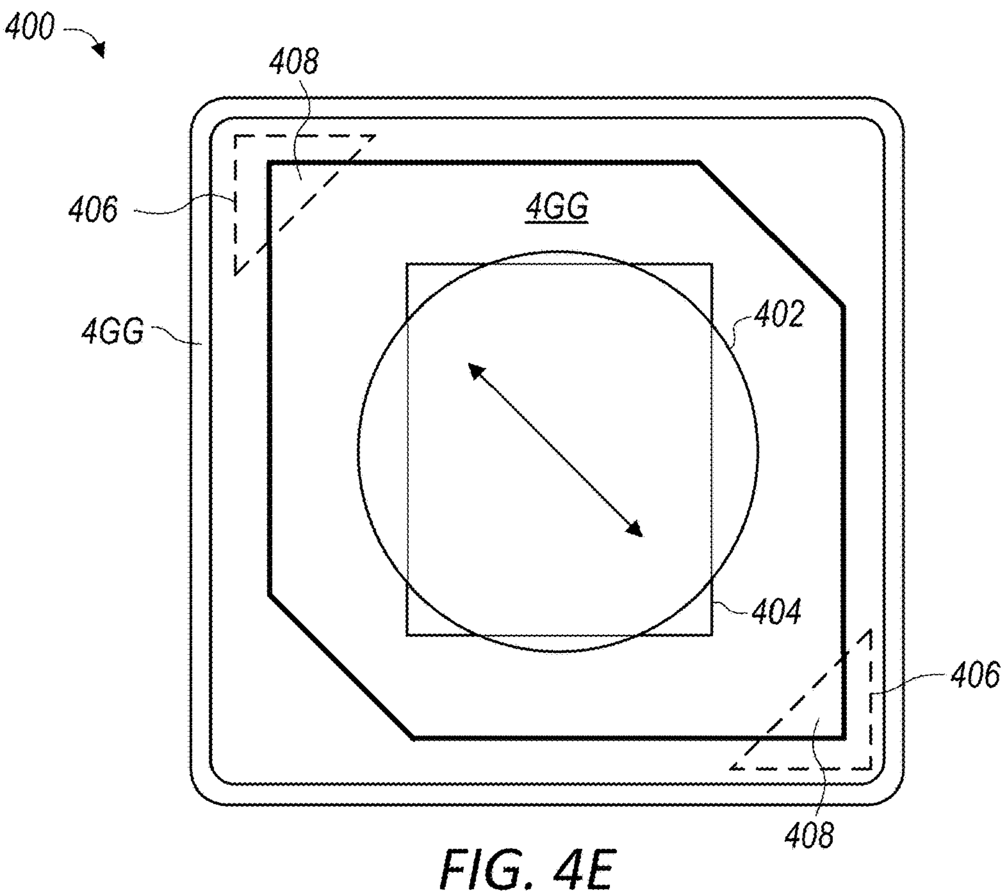
Figure 4F:
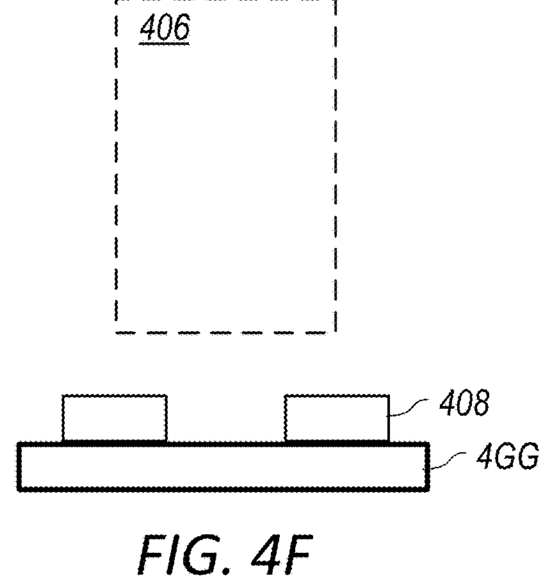
Figure 4G:
Figure 4G:
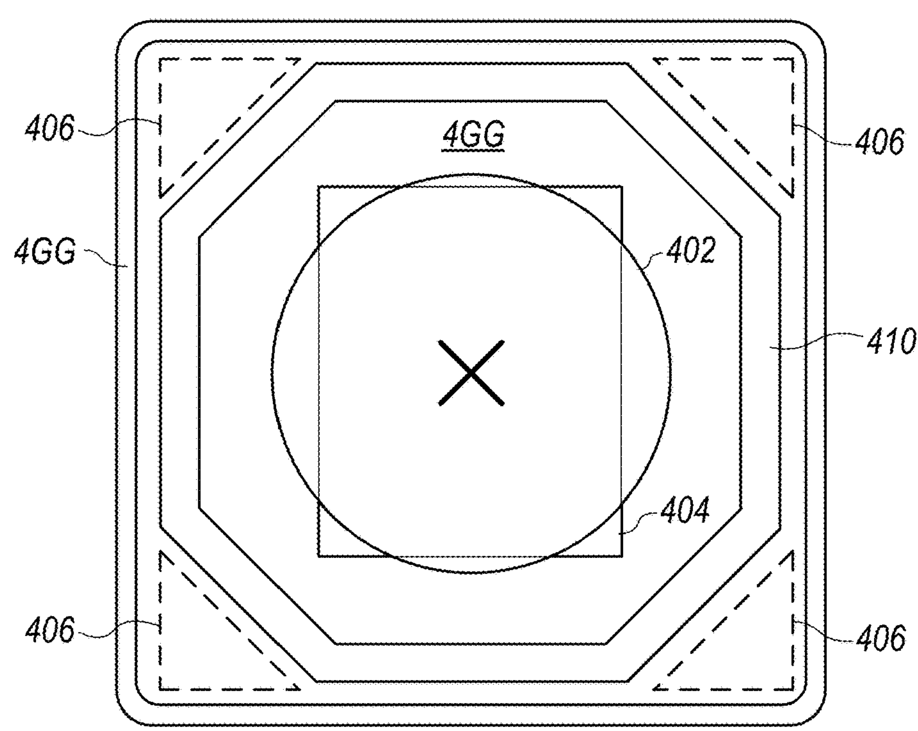
Figure 4H:
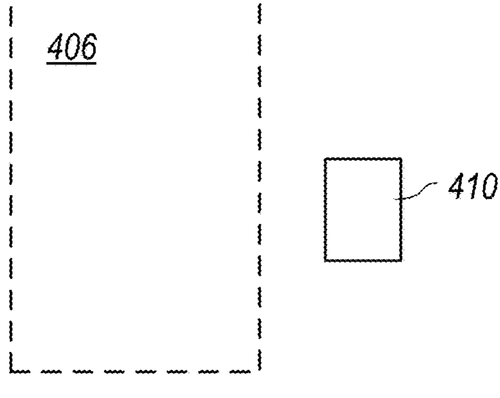

FIGS. 4A-4H illustrate views of another example camera system 400 that includes a ball bearing sensor shift arrangement (e.g., a ball bearing sensor shift arrangement for coupling with horizontally-oriented coils), in accordance with some embodiments. FIG. 4A shows a schematic top view of the camera system 400. FIG. 4B shows a perspective view of at least a portion of an example ball bearing sensor shift arrangement of the camera system 400. FIG. 4C shows a schematic top view of a portion of the camera system 400 including a first optical image stabilization (OIS) carrier frame of the ball bearing sensor shift arrangement. FIG. 4D shows a schematic side cross-sectional view of a portion of the camera system 400 including the first OIS carrier frame in FIG. 4C. FIG. 4E shows a schematic top view of a portion of the camera system 400 including a second OIS carrier frame of the ball bearing sensor shift arrangement. FIG. 4F shows a schematic side cross-sectional view of a portion of the camera system 400 including the second OIS carrier frame in FIG. 4E. FIG. 4G shows a schematic top view of a portion of the camera system 400 including an autofocus (AF) coil. FIG. 4H shows a schematic cross-sectional view of a portion of the camera system 400 including the AF coil in FIG. 4G.

According to various embodiments, the camera system 400 may include a lens group 402, an image sensor 404, one or more voice coil motor (VCM) actuators (e.g., comprising fixed magnets 406, OIS coils 408, and/or one or more AF coils 410), and/or a ball bearing sensor shift arrangement (e.g., comprising a first OIS carrier frame 412, a second OIS carrier frame 414, and/or an AF carrier frame). The lens group 402 may include one or more lens elements that define an optical axis of the camera system 400. Additionally, or alternatively, the image sensor 404 may define an optical axis of the camera system 400. For example, the optical axis may be an axis that is orthogonal to a light-receiving surface of the image sensor 404.

In some embodiments, the VCM actuator(s) may include one or more OIS actuators and/or one or more AF actuators. According to some embodiments, the OIS actuator(s) may include one or more magnets (e.g., fixed magnets 406) and one or more coils (e.g., OIS coils 408). Furthermore, the AF actuator(s) may include magnet(s) (e.g., fixed magnets 406) and coil(s) (e.g., AF coil 410) in some embodiments.

According to some examples, the camera system 400 may include a shield can 416 that at least partially encases internal components of the camera system 400. The fixed magnets 406 may be fixedly coupled with the shield can 416. For example, the camera system 400 may include a spacer (e.g., spacer 220 in FIG. 2A) attached to an underside of the shield can 416, and the fixed magnets 406 may be attached to the spacer, e.g., as further discussed herein with reference to FIG. 2A.

In various embodiments, the OIS coils 408 may be coupled with one or more carrier frames of the ball bearing sensor shift arrangement. As indicated in FIG. 4B, for example, a first subset of the OIS coils 408 may be fixedly attached to the first OIS carrier frame 412, and a second subset of the OIS coils 408 may be fixedly attached to the second OIS carrier frame 414. The OIS coils 408 may be positioned proximate the fixed magnets 406 such that, when driven with an electric current, the OIS coils 408 are capable of electromagnetically interacting with the fixed magnets 406 to move the image sensor 404 in directions orthogonal to the optical axis.

As indicated in FIG. 4B, the first OIS carrier frame 412 may include horizontally-oriented surfaces (e.g., horizontally-oriented surface 418) to which the first subset of the OIS coils 408 may be attached. In this non-limiting example, the first subset of the OIS coils 408 may include a first OIS coil 408 attached to a first horizontally-oriented surface 418, and a second OIS coil 408 attached to a second horizontally-oriented surface 418. The first horizontally-oriented surface 418 and the second horizontally-oriented surface 418 may be opposite one another, e.g., relative to the lens group 402.

Similarly, as indicated in FIG. 4B, the second OIS carrier frame 414 may include horizontally-oriented surfaces (e.g., horizontally-oriented surface 420) to which the second subset of the OIS coils 408 may be attached. In this non-limiting example, the second subset of the OIS coils 408 may include a first OIS coil 408 attached to a first horizontally-oriented surface 420, and a second OIS coil 408 attached to a second horizontally-oriented surface 420. The first horizontally-oriented surface 420 and the second horizontally-oriented surface 420 may be opposite one another, e.g., relative to the lens group 402.

According to various embodiments, the first subset of OIS coils 408 attached to the first OIS carrier frame 412 may be arranged to move the image sensor 404 in directions parallel to a first axis. The second subset of OIS coils 408 attached to the second OIS carrier frame 414 may be arranged to move the image sensor 404 in directions parallel to a second axis that is orthogonal to the first axis. As discussed in further detail herein with reference to at least FIGS. 2C, 2D, and 3C, the camera system 400 may include ball bearings that allow the frames of the ball bearing sensor shift arrangement to move in accordance with desired OIS and/or AF motion (e.g., using the VCM actuator(s)).

In some embodiments, the OIS coils 408 may be horizontally oriented such that, when driven with an electric current, the electric current flows through the OIS coils 408 in directions along a plane that is orthogonal to the optical axis. In other embodiments, one or more of the OIS coils 408 may be vertically oriented, e.g., as discussed herein with reference to FIGS. 1A-3C.

In some embodiments, at least a portion of the first OIS carrier frame 412 may be positioned above at least a portion of the second OIS carrier frame 414. For example, a horizontally-oriented surface of the first OIS carrier frame 412 may be positioned above a horizontally-oriented surface of the second OIS carrier frame 414, e.g., in a manner similarly described herein with reference to horizontally-oriented surfaces 118 and 122 in FIG. 1B. The horizontally-oriented surface of the first OIS carrier frame 412 may be parallel to the horizontally-oriented surface of the second OIS carrier frame 414. Furthermore, the horizontally-oriented surface of the first OIS carrier frame 412 may be positioned, in a direction parallel to the optical axis, between the second OIS carrier frame 414 and the lens group 402.

As indicated in FIGS. 4A-4B, for example, the fixed magnets 406 and the OIS coils 408 may be considered "corner" magnets and coils in some embodiments, as the fixed magnets 406 and the OIS coils 408 are positioned at corners of the camera system 400 (and/or proximate corners of the image sensor 404). In some other embodiments, the camera system may include fixed magnets and OIS coils that may be considered "side" magnets and coils, e.g., as discussed herein with reference to FIGS. 5A-5H. The side magnets and coils may be positioned at sides of the camera system (and/or proximate sides of the image sensor).

As previously mentioned, the ball bearing sensor shift arrangement may include an AF carrier frame. While not shown in FIGS. 4A-4H, example AF carrier frames are discussed herein with reference to FIGS. 2A-3C.

Figure 5A:
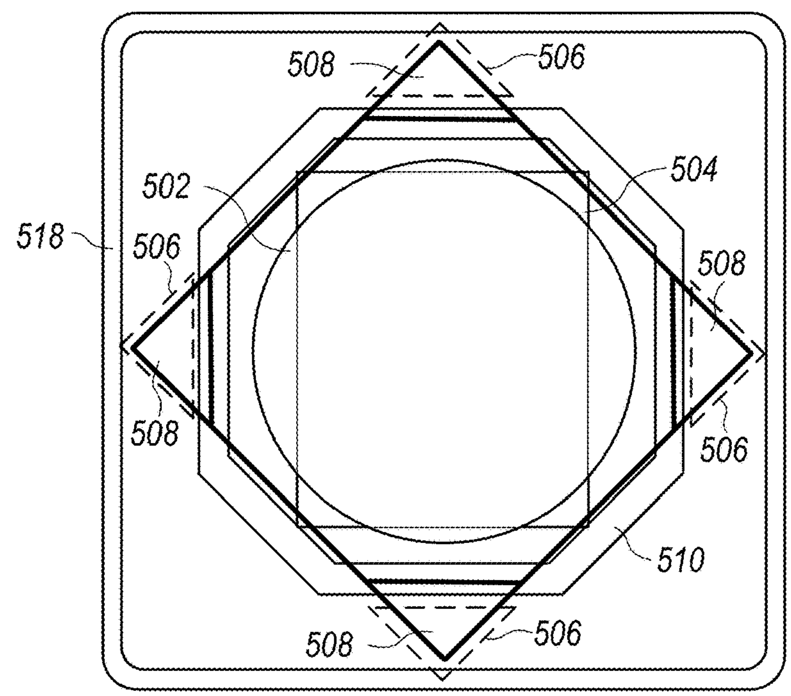
FIGS. 5A-5H illustrate views of yet another example camera system that includes a ball bearing sensor shift arrangement (e.g., a ball bearing sensor shift arrangement for coupling with side coils), in accordance with some embodiments.
Figure 5B:
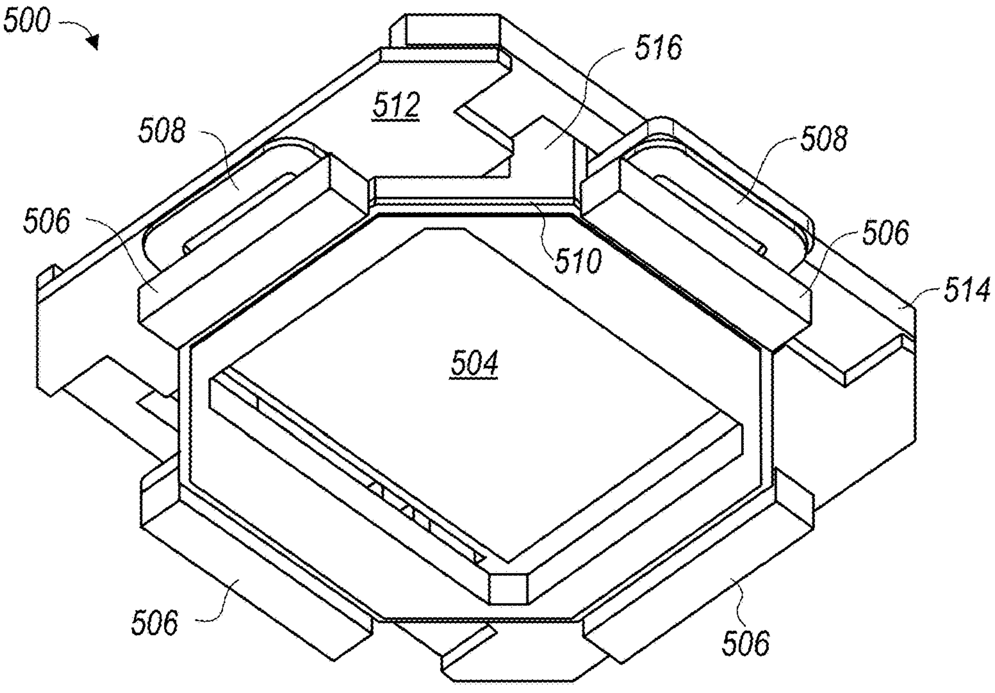
Figure 5C:
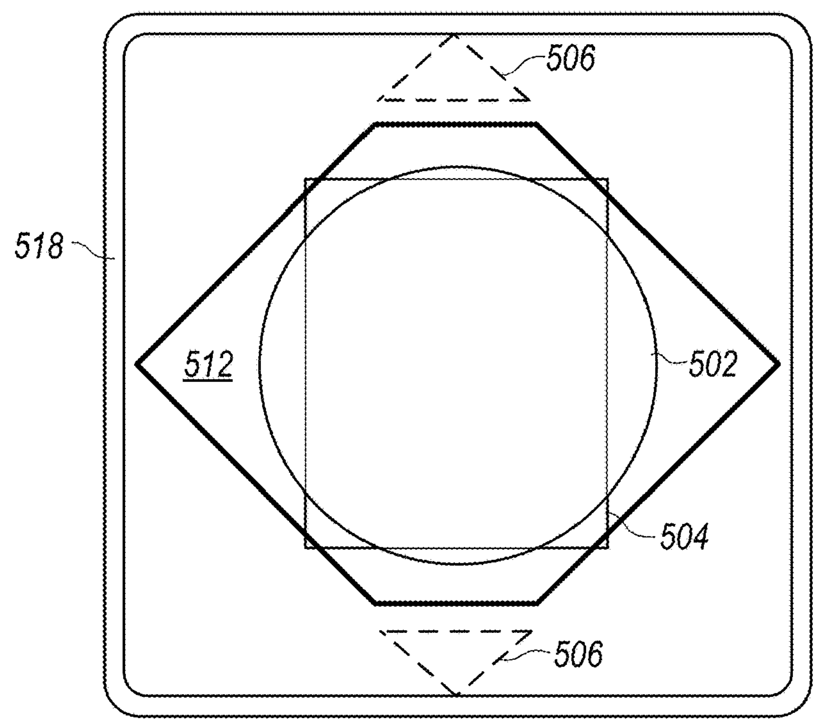
Figure 5D:
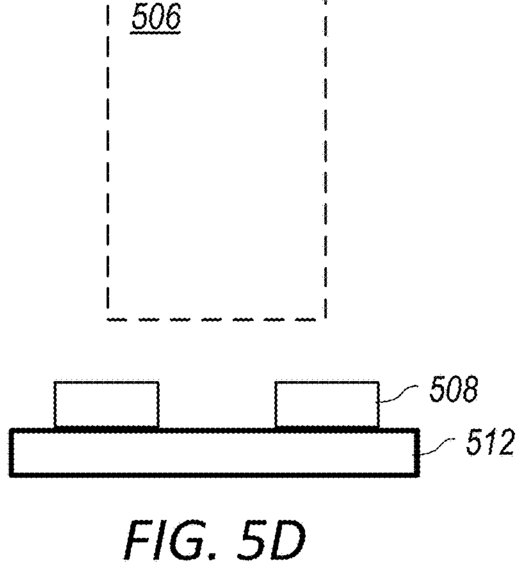
Figure 5E:
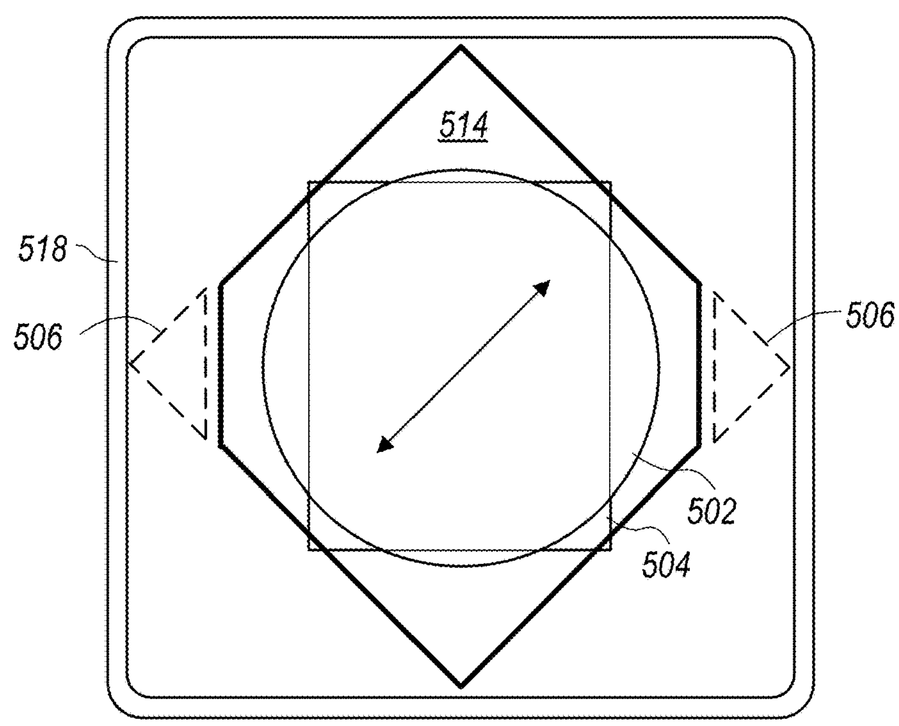
Figure 5F:
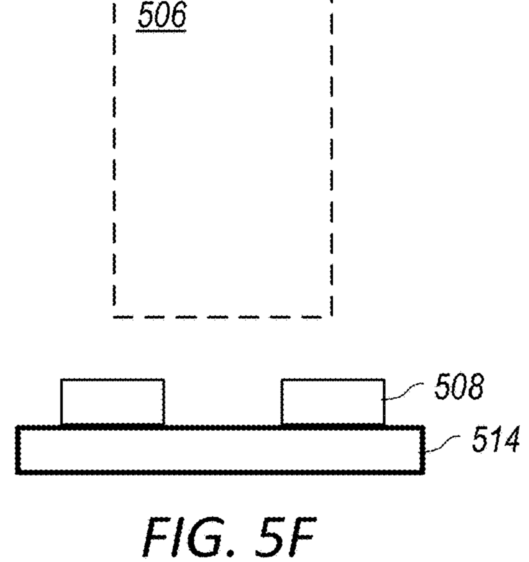
Figure 5G:
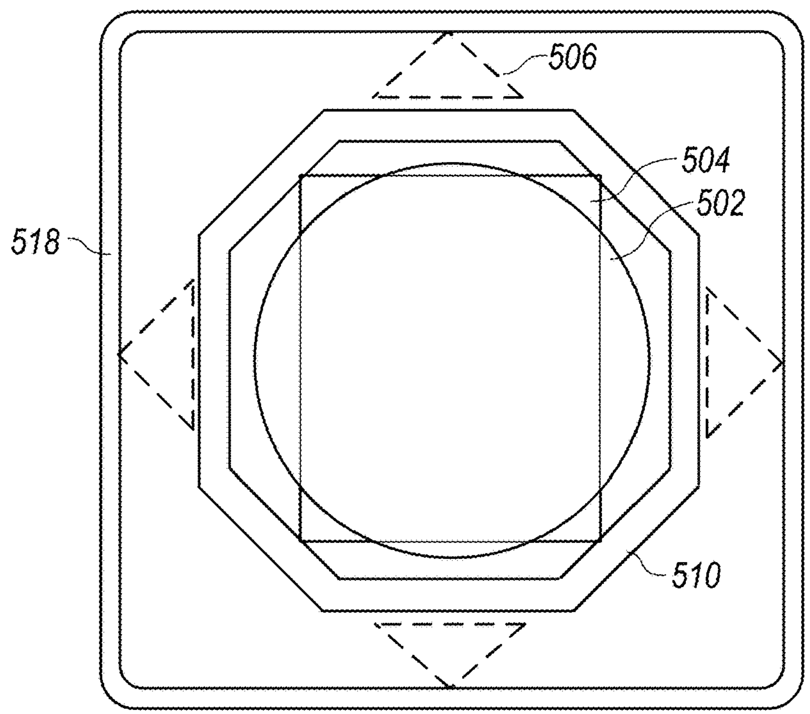
Figure 5H:
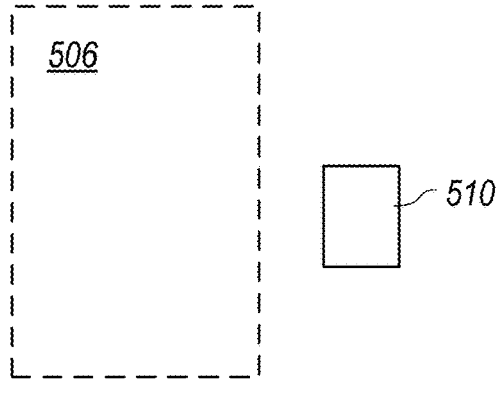

FIGS. 5A-5H illustrate views of yet another example camera system 500 that includes a ball bearing sensor shift arrangement (e.g., a ball bearing sensor shift arrangement for coupling with side coils), in accordance with some embodiments. FIG. 5A shows a schematic top view of the camera system 500. FIG. 5B shows a perspective view of at least a portion of an example ball bearing sensor shift arrangement of the camera system 500. FIG. 5C shows a schematic top view of a portion of the camera system 500 including a first optical image stabilization (OIS) carrier frame of the ball bearing sensor shift arrangement. FIG. 5D shows a schematic side cross-sectional view of a portion of the camera system 500 including the first OIS carrier frame in FIG. 5C. FIG. 5E shows a schematic top view of a portion of the camera system 500 including a second OIS carrier frame of the ball bearing sensor shift arrangement. FIG. 5F shows a schematic side cross-sectional view of a portion of the camera system 500 including the second OIS carrier frame in FIG. 5E. FIG. 5G shows a schematic top view of a portion of the camera system 500 including an autofocus (AF) coil. FIG. 5H shows a schematic cross-sectional view of a portion of the camera system 500 including the AF coil in FIG. 5G.

According to various embodiments, the camera system 400 may include a lens group 502, an image sensor 504, one or more voice coil motor (VCM) actuators (e.g., comprising fixed magnets 506, OIS coils 508, and/or one or more AF coils 510), and/or a ball bearing sensor shift arrangement (e.g., comprising a first OIS carrier frame 512, a second OIS carrier frame 514, and/or an AF carrier frame 516). The lens group 502 may include one or more lens elements that define an optical axis of the camera system 500. Additionally, or alternatively, the image sensor 504 may define an optical axis of the camera system 500. For example, the optical axis may be an axis that is orthogonal to a light-receiving surface of the image sensor 504.

In some embodiments, the VCM actuator(s) may include one or more OIS actuators and/or one or more AF actuators. According to some embodiments, the OIS actuator(s) may include one or more magnets (e.g., fixed magnets 506) and one or more coils (e.g., OIS coils 508). Furthermore, the AF actuator(s) may include magnet(s) (e.g., fixed magnets 506) and coil(s) (e.g., AF coil 510) in some embodiments.

According to some examples, the camera system 500 may include a shield can 518 that at least partially encases internal components of the camera system 500. The fixed magnets 506 may be fixedly coupled with the shield can 518. For example, the camera system 500 may include a spacer (e.g., spacer 220 in FIG. 2A) attached to an underside of the shield can 518, and the fixed magnets 506 may be attached to the spacer, e.g., as further discussed herein with reference to FIG. 2A.

In various embodiments, the OIS coils 508 may be coupled with one or more carrier frames of the ball bearing sensor shift arrangement. As indicated in FIG. 5B, for example, a first subset of the OIS coils 508 may be fixedly attached to the first OIS carrier frame 512, and a second subset of the OIS coils 508 may be fixedly attached to the second OIS carrier frame 514. The OIS coils 508 may be positioned proximate the fixed magnets 506 such that, when driven with an electric current, the OIS coils 508 are capable of electromagnetically interacting with the fixed magnets 506 to move the image sensor 504 in directions orthogonal to the optical axis.

As indicated in FIG. 5B, the first OIS carrier frame 512 may include horizontally-oriented surfaces to which the first subset of the OIS coils 508 may be attached. In this non-limiting example, the first subset of the OIS coils 508 may include a first OIS coil 508 attached to a first horizontally-oriented surface of the first OIS carrier frame 512, and a second OIS coil 508 attached to a second horizontally-oriented surface of the first OIS carrier frame 512. The first horizontally-oriented surface and the second horizontally-oriented surface may be opposite one another, e.g., relative to the lens group 502.

Similarly, as indicated in FIG. 5B, the second OIS carrier frame 514 may include horizontally-oriented surfaces to which the second subset of the OIS coils 508 may be attached. In this non-limiting example, the second subset of the OIS coils 508 may include a first OIS coil 508 attached to a first horizontally-oriented surface of the second OIS carrier frame 514, and a second OIS coil 408 attached to a second horizontally-oriented surface of the second OIS carrier frame 514. The first horizontally-oriented surface and the second horizontally-oriented surface may be opposite one another, e.g., relative to the lens group 502.

According to various embodiments, the first subset of OIS coils 508 attached to the first OIS carrier frame 512 may be arranged to move the image sensor 504 in directions parallel to a first axis. The second subset of OIS coils 508 attached to the second OIS carrier frame 514 may be arranged to move the image sensor 504 in directions parallel to a second axis that is orthogonal to the first axis. As discussed in further detail herein with reference to at least FIGS. 2C, 2D, and 3C, the camera system 500 may include ball bearings that allow the frames of the ball bearing sensor shift arrangement to move in accordance with desired OIS and/or AF motion (e.g., using the VCM actuator(s)).

In some embodiments, the OIS coils 508 may be horizontally oriented such that, when driven with an electric current, the electric current flows through the OIS coils 508 in directions along a plane that is orthogonal to the optical axis. In other embodiments, one or more of the OIS coils 508 may be vertically oriented, e.g., as discussed herein with reference to FIGS. 1A-3C.

In some embodiments, at least a portion of the first OIS carrier frame 512 may be positioned above at least a portion of the second OIS carrier frame 514. For example, a horizontally-oriented surface of the first OIS carrier frame 512 may be positioned above a horizontally-oriented surface of the second OIS carrier frame 514, e.g., in a manner similarly described herein with reference to horizontally-oriented surfaces 118 and 122 in FIG. 1B. The horizontally-oriented surface of the first OIS carrier frame 512 may be parallel to the horizontally-oriented surface of the second OIS carrier frame 514. Furthermore, the horizontally-oriented surface of the first OIS carrier frame 512 may be positioned, in a direction parallel to the optical axis, between the second OIS carrier frame 514 and the lens group 502.

As indicated in FIGS. 5A-5B, for example, the fixed magnets 506 and the OIS coils 508 may be considered "side" magnets and coils in some embodiments, as the fixed magnets 506 and the OIS coils 508 are positioned at sides of the camera system 500 (and/or proximate sides of the image sensor 504). In some other embodiments, the camera system may include fixed magnets and OIS coils that may be considered "corner" magnets and coils, e.g., as discussed herein with reference to FIGS. 1A-4H.

Figure 6:
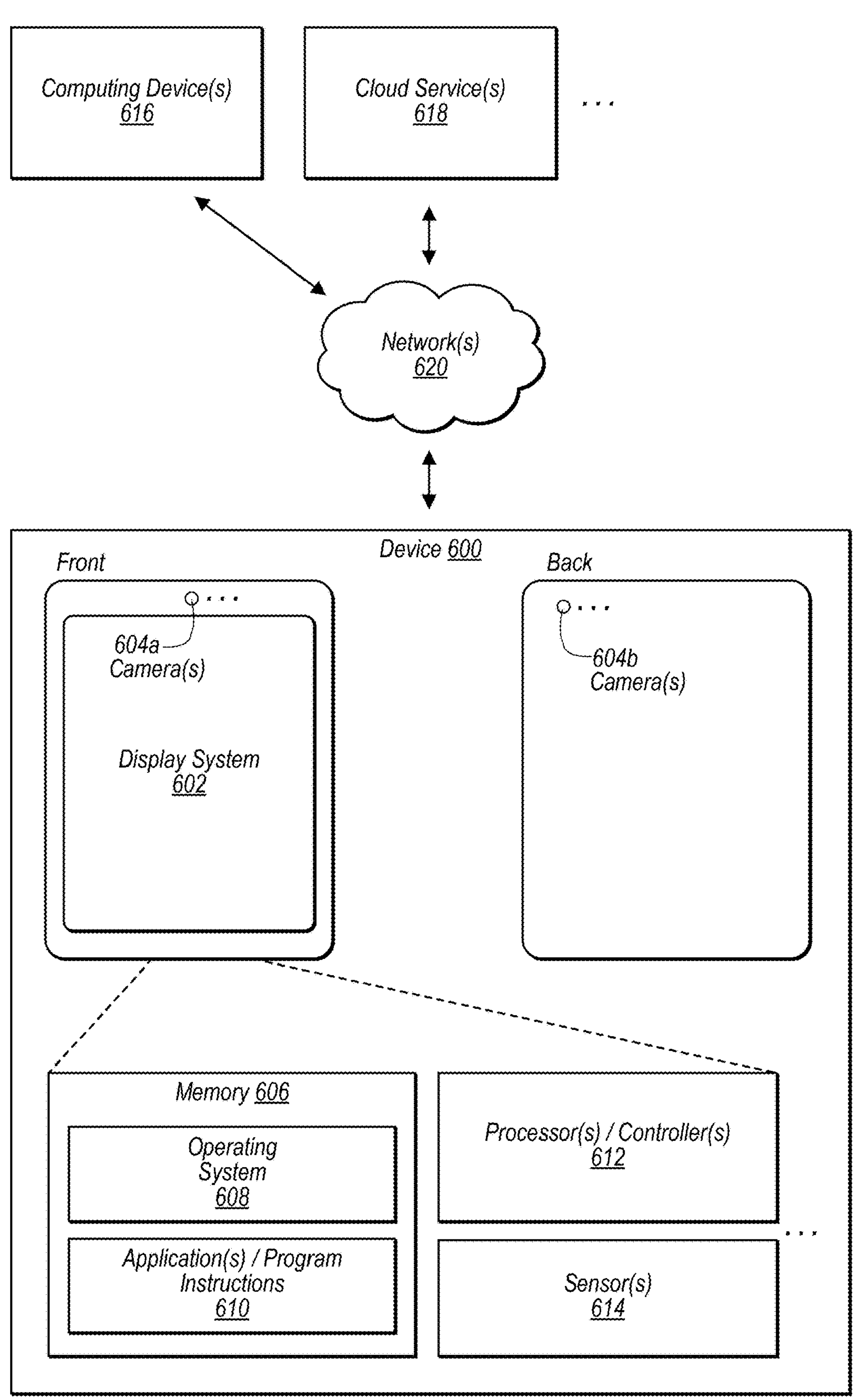
FIG. 6 illustrates a schematic representation of an example environment comprising a device that may include a camera system with a ball bearing sensor shift arrangement, in accordance with some embodiments.

FIG. 6 illustrates a schematic representation of an example environment comprising a device 600 that may include one or more cameras. For example, the device 600 may include a camera system with a ball bearing sensor shift arrangement, such as the camera systems and/or ball bearing sensor shift arrangements described herein with reference to FIGS. 1A-5H. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604*a* may be provided at a front side of the device 600, e.g., as indicated in FIG. 6. Additionally, or alternatively, one or more rear-facing cameras 604*b* may be provided at a rear side of the device 600. In some embodiments comprising multiple cameras 604, some or all of the cameras 604 may be the same as, or similar to, each other. Additionally, or alternatively, some or all of the cameras 604 may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller (s), etc.), and/or one or more sensors 614 (e.g., orientation sensor(s), proximity sensor(s), and/or position sensor(s), etc.). In some embodiments, the device 600 may communicate with one or more other devices and/or services, such as computing device(s) 616, cloud service(s) 618, etc., via one or more networks 620. For example, the device 600 may include a network interface (e.g., network interface 710 in FIG. 7) that enables the device 600 to transmit data to, and receive data from, the network(s) 620. Additionally, or alternatively, the device 600 may be capable of communicating with other devices via wireless communication using any of a variety of communications standards, protocols, and/or technologies.

Figure 7:
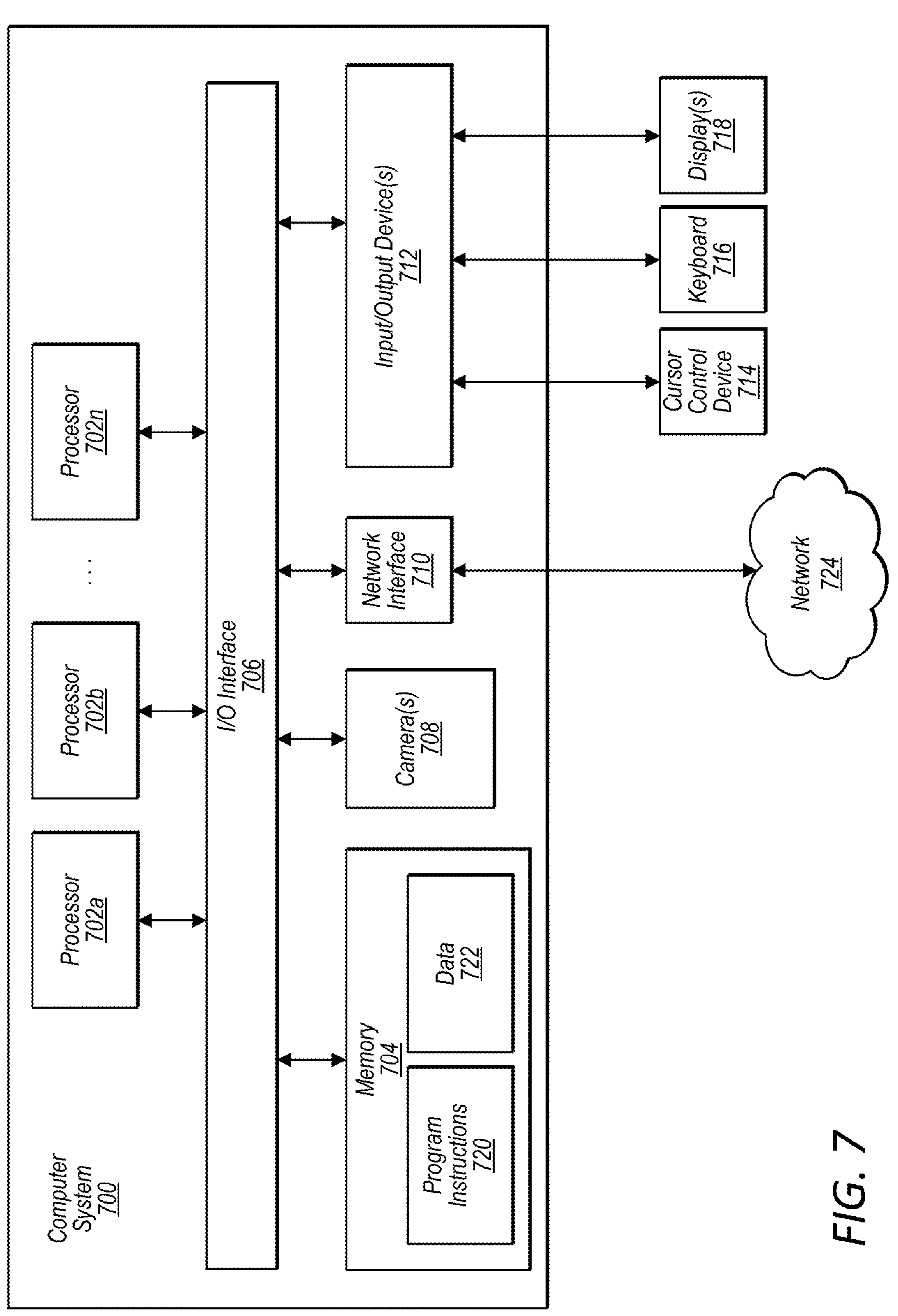
FIG. 7 illustrates a schematic block diagram of an example environment comprising a computer system that may include a camera system with a ball bearing sensor shift arrangement, in accordance with some embodiments.

FIG. 7 illustrates a schematic block diagram of an example environment comprising a computer system 700 that may include a camera system with a ball bearing sensor shift arrangement, such as the camera systems and/or ball bearing sensor shift arrangements described herein with reference to FIGS. 1A-6. In addition, computer system 700 may implement methods for controlling operations of the camera and/or for performing image processing on images captured with the camera. In some embodiments, the device 600 (described herein with reference to FIG. 6) may additionally, or alternatively, include some or all of the functional components of the described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processors 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 702 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:

a lens group;

an image sensor;

one or more voice coil motor (VCM) actuators; and a ball bearing sensor shift arrangement coupled with the image sensor, wherein the ball bearing sensor shift arrangement comprises:

one or more OIS carrier frames coupled with one or more of the one or more VCM actuators to move the image sensor in directions orthogonal to an optical axis of the camera; and an AF carrier frame coupled with at least one of the one or more VCM actuators to move the image sensor in at least one direction parallel to the optical axis;

a first set of ball bearings disposed between the one or more OIS carrier frames and the AF carrier frame; and a second set of ball bearings disposed between the AF carrier frame and a fixed structure of the camera;

wherein the one or more OIS carrier frames and the AF carrier frame are configured to move on the first set and the second set of ball bearings so as to enable motion of the image sensor in three degrees-of-freedom (DOF).

2. The camera of claim 1, wherein the one or more OIS carrier frames comprise:

a first OIS carrier frame to which a first subset of OIS coils is attached, wherein the first subset is arranged to move the image sensor in directions parallel to a first axis; and a second OIS carrier frame to which a second subset of OIS coils is attached, wherein the second subset is arranged to move the image sensor in directions parallel to a second axis that is orthogonal to the first axis.

3. The camera of claim 2, wherein the OIS coils are vertically oriented such that, when driven with an electric current, the electric current flows through the OIS coils in directions along a plane that is parallel to the optical axis.

4. The camera of claim 2, wherein the OIS coils are horizontally oriented such that, when driven with an electric current, the electric current flows through the OIS coils in directions along a plane that is orthogonal to the optical axis.

5. The camera of claim 1, wherein the one or more OIS carrier frames comprise:

a single OIS carrier frame to which OIS coils are attached, wherein the OIS coils comprise:

a first subset of OIS coils to move the image sensor in directions parallel to a first axis; and a second subset of OIS coils to move the image sensor in directions parallel to a second axis that is orthogonal to the first axis.

6. The camera of claim 5, wherein the OIS coils are vertically oriented such that, when driven with an electric current, the electric current flows through the OIS coils in directions along a plane that is parallel to the optical axis.

7. The camera of claim 5, wherein the OIS coils are horizontally oriented such that, when driven with an electric current, the electric current flows through the OIS coils in directions along a plane that is orthogonal to the optical axis.

8. The camera of claim 1, comprising at least one AF coil coupled to and configured to move with the AF carrier frame.

9. A device, comprising:

one or more processors;

memory storing program instructions executable by the one or more processors to control operations of a camera; and the camera, comprising:

a lens group;

an image sensor;

one or more voice coil motor (VCM) actuators; and a ball bearing sensor shift arrangement coupled with the image sensor, wherein the ball bearing sensor shift arrangement comprises:

one or more OIS carrier frames coupled with one or more of the one or more VCM actuators to move the image sensor in directions orthogonal to an optical axis of the camera; and an AF carrier frame coupled with at least one of the one or more VCM actuators to move the image sensor in at least one direction parallel to the optical axis;

a first set of ball bearings disposed between the one or more OIS carrier frames and the AF carrier frame; and a second set of ball bearings disposed between the AF carrier frame and a fixed structure of the camera;

wherein the one or more OIS carrier frames and the AF carrier frame are configured to move on the first set and the second set of ball bearings so as to enable motion of the image sensor in three degrees-of-freedom (DOF).

10. The device of claim 9, wherein the one or more OIS carrier frames comprise:

a first OIS carrier frame to which a first subset of OIS coils is attached, wherein the first subset is arranged to move the image sensor in directions parallel to a first axis; and a second OIS carrier frame to which a second subset of OIS coils is attached, wherein the second subset is arranged to move the image sensor in directions parallel to a second axis that is orthogonal to the first axis.

11. The device of claim 10, wherein the first set of ball bearings is disposed between the first OIS carrier frame and the second OIS carrier frame, the ball bearing sensor shift arrangement further comprising a third set of ball bearings disposed between the second OIS carrier frame and the AF carrier frame.

12. The device of claim 11, wherein the camera further comprises:

a flex circuit, comprising:

a first portion attached to the first OIS carrier frame; and a second portion attached to the AF carrier frame;

wherein the flex circuit is configured to convey electrical signals between the first OIS carrier frame and the AF carrier frame.

13. The device of claim 9, wherein the one or more OIS carrier frames comprise:

a single OIS carrier frame to which OIS coils are attached, wherein the OIS coils comprise:

a first subset of OIS coils to move the image sensor in directions parallel to a first axis; and a second subset of OIS coils to move the image sensor in directions parallel to a second axis that is orthogonal to the first axis.

14. The device of claim 13, wherein the camera further comprises:

a flexure arrangement, comprising:

an inner frame attached to the single OIS carrier frame;

an outer frame attached to the AF carrier frame; and flexure arms extending from the inner frame to the outer frame, wherein the flexure arms comprise electrical traces configured to convey electrical signals between the inner frame and the outer frame.

15. The device of claim 9, wherein the one or more VCM actuators comprise a plurality of fixed magnets.

16. A system, comprising:

an image sensor; and a ball bearing sensor shift arrangement coupled with the image sensor, wherein the ball bearing sensor shift arrangement comprises:

one or more OIS carrier frames coupled with one or more of the one or more VCM actuators to move the image sensor in directions orthogonal to an optical axis of the camera; and an AF carrier frame coupled with at least one of the one or more VCM actuators to move the image sensor in at least one direction parallel to the optical axis;

a first set of ball bearings disposed between the one or more OIS carrier frames and the AF carrier frame; and a second set of ball bearings disposed between the AF carrier frame and a fixed structure of the camera;

wherein the one or more OIS carrier frames and the AF carrier frame are configured to move on the first set and the second set of ball bearings so as to enable motion of the image sensor in three degrees-of-freedom (DOF).

17. The system of claim 16, further comprising:

a plurality of fixed magnets; and

OIS coils coupled to the one or more OIS carrier frames and located proximate corners of the image sensor, and wherein the OIS coils are configured to be disposed proximate corner magnets of the fixed magnets.

18. The system of claim 16, further comprising:

a plurality of fixed magnets; and

OIS coils located proximate sides of the image sensor, and wherein the OIS coils are configured to be disposed proximate side magnets of the fixed magnets.

19. The system of claim 16, wherein the one or more OIS carrier frames comprise:

a first OIS carrier frame to which a first subset of OIS coils is attached, wherein the first subset is arranged to move the image sensor in directions parallel to a first axis; and a second OIS carrier frame to which a second subset of OIS coils is attached, wherein the second subset is arranged to move the image sensor in directions parallel to a second axis that is orthogonal to the first axis.

20. The system of claim 16, wherein the one or more OIS carrier frames comprise:

a single OIS carrier frame to which OIS coils are attached, wherein the OIS coils comprise:

a first subset of OIS coils to move the image sensor in directions parallel to a first axis; and a second subset of OIS coils to move the image sensor in directions parallel to a second axis that is orthogonal to the first axis.

* * * * *